US010393540B2

(12) United States Patent
Han et al.

(10) Patent No.: US 10,393,540 B2
(45) Date of Patent: Aug. 27, 2019

(54) TECHNOLOGIES FOR PEDESTRIAN DEAD RECKONING

(71) Applicant: INTEL CORPORATION, Santa Clara, CA (US)

(72) Inventors: Ke Han, Shanghai (CN); Xun Wang, Shanghai (CN); Xiaodong Cai, Shanghai (CN); Liang Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/576,513

(22) PCT Filed: Jun. 26, 2015

(86) PCT No.: PCT/CN2015/082562
§ 371 (c)(1),
(2) Date: Nov. 22, 2017

(87) PCT Pub. No.: WO2016/206119
PCT Pub. Date: Dec. 29, 2016

(65) Prior Publication Data
US 2018/0180443 A1 Jun. 28, 2018

(51) Int. Cl.
*G01C 21/00* (2006.01)
*G01C 22/00* (2006.01)
(Continued)

(52) U.S. Cl.
CPC ........... *G01C 22/006* (2013.01); *G01C 21/16* (2013.01); *H04W 4/02* (2013.01)

(58) Field of Classification Search
CPC ...... G01C 22/00; G01C 22/006; G01C 21/16; H04W 4/00; H04W 4/02
See application file for complete search history.

(56) References Cited

U.S. PATENT DOCUMENTS 9,341,683 B2 * 5/2016 Friend .................. G01C 21/165
10,001,386 B2 * 6/2018 Curtis .................. G01C 22/006
(Continued)

FOREIGN PATENT DOCUMENTS

CN 103411607 11/2013
CN 103411607 A 11/2013
(Continued)

OTHER PUBLICATIONS

PCT Search Report and Written Opinion for PCT/CN2015/082562, completed Feb. 3, 2016.
(Continued)

*Primary Examiner* — Yonel Beaulieu
(74) *Attorney, Agent, or Firm* — Barnes & Thornburg LLP

(57) ABSTRACT

Technologies for determining a user's location include a mobile computing device (100) to determine, based on sensed inertial characteristics of the device, a walking gait of a user. The walking gait is one of a first gait indicative of the user holding the device to the user's side or a second gait indicative of the user swinging the device along the user's side. The device further detects that the user has taken a physical step based on the inertial characteristics and the determined walking gait of the user, and determines a raw directional heading of the device indicative of a direction of the physical step. The device determines an estimated location of the user based on the determined raw directional heading, an estimated step length, and the user's previous location.

25 Claims, 10 Drawing Sheets

(51) Int. Cl.
*H04W 4/02* (2018.01)
*G01C 21/16* (2006.01)

(56) References Cited

U.S. PATENT DOCUMENTS

| | | | | |
|---|---|---|---|---|
| 10,041,800 | B2* | 8/2018 | Morrison | G01C 21/16 |
| 2012/0006112 | A1 | 1/2012 | Lee | |
| 2012/0136573 | A1* | 5/2012 | Janardhanan | G01C 21/165 701/512 |
| 2013/0046463 | A1 | 2/2013 | Bengtson et al. | |
| 2014/0085050 | A1* | 3/2014 | Luna | G07C 9/00087 340/5.82 |
| 2014/0236479 | A1* | 8/2014 | Janardhanan | G01C 21/165 701/512 |
| 2015/0088408 | A1 | 3/2015 | Yamaoka | |
| 2015/0285659 | A1* | 10/2015 | Curtis | G01C 22/006 702/97 |
| 2016/0290807 | A1* | 10/2016 | Janardhanan | G01C 21/165 |
| 2017/0203154 | A1* | 7/2017 | Solinsky | G01C 21/005 |
| 2018/0156920 | A1* | 6/2018 | Diggelen | G01S 19/19 |

FOREIGN PATENT DOCUMENTS

| | | | |
|---|---|---|---|
| CN | 103471589 | | 12/2013 |
| CN | 103471589 | A | 12/2013 |
| CN | 104061934 | | 9/2014 |
| CN | 104061934 | A | 9/2014 |
| CN | 104180805 | | 12/2014 |
| CN | 104180805 | A | 12/2014 |
| CN | 104680559 | | 6/2015 |
| CN | 104680559 | A | 6/2015 |
| EP | 2527791 | | 11/2012 |
| WO | 2016/042296 | | 3/2016 |

OTHER PUBLICATIONS

International search report for PCT application No. PCT/CN2015/082562, dated Mar. 23, 2016 (4 pages).

Written opinion for PCT application No. PCT/CN2015/082562, dated Mar. 23, 2016 (4 pages).

Partial supplementary search report in European patent application No. 15896015.3, dated Jan. 28, 2019 (14 pages).

* cited by examiner

TECHNOLOGIES FOR PEDESTRIAN DEAD RECKONING

CROSS REFERENCE TO RELATED APPLICATIONS

The present application claims priority to and is a national stage entry under 35 USC § 371(b) of International Application No. PCT/CN2015/082562, which was filed Jun. 26, 2015, entitled "TECHNOLOGIES FOR PEDESTRIAN DEAD RECKONING."

BACKGROUND

Mobile navigation and location-tracking systems are commonly included on mobile computing devices such as smartphones. For example, a mobile computing device may be used to guide a user between locations using, for example, global positioning system (GPS) circuitry on the mobile computing device and referencing a geographical map. However, such systems are frequently limited to outdoor applications due to a need for network and/or GPS connectivity. Indoor navigation and location tracking solutions oftentimes track the location of the mobile computing device without relying on GPS and/or external sensors.

Mobile computing devices typically include a number of inertial sensors that collect data, which may be analyzed by, for example, an on-board inertial measurement unit (IMU) to determine various context of the user, such as the user's estimated location. "Dead reckoning" is one typical process of calculating a user's current position based on a previously determined position, estimated speed, and elapsed period of time, which may be determined based on sensor data generated by the inertial sensors. On-board inertial sensors such as accelerometers and magnetometers make it possible for mobile computing devices to count a user's steps and take compass readings for navigational purposes (i.e., for pedestrian dead reckoning). Although pedestrian dead reckoning (PDR) permits indoor navigation while consuming less power (e.g., compared to GPS navigation) and requiring less a priori information, accurately performing pedestrian dead reckoning has several challenges. For example, pockets of large magnetic distortion in buildings and/or the user's hand motion may cause typical PDR algorithm traces to be inaccurate.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
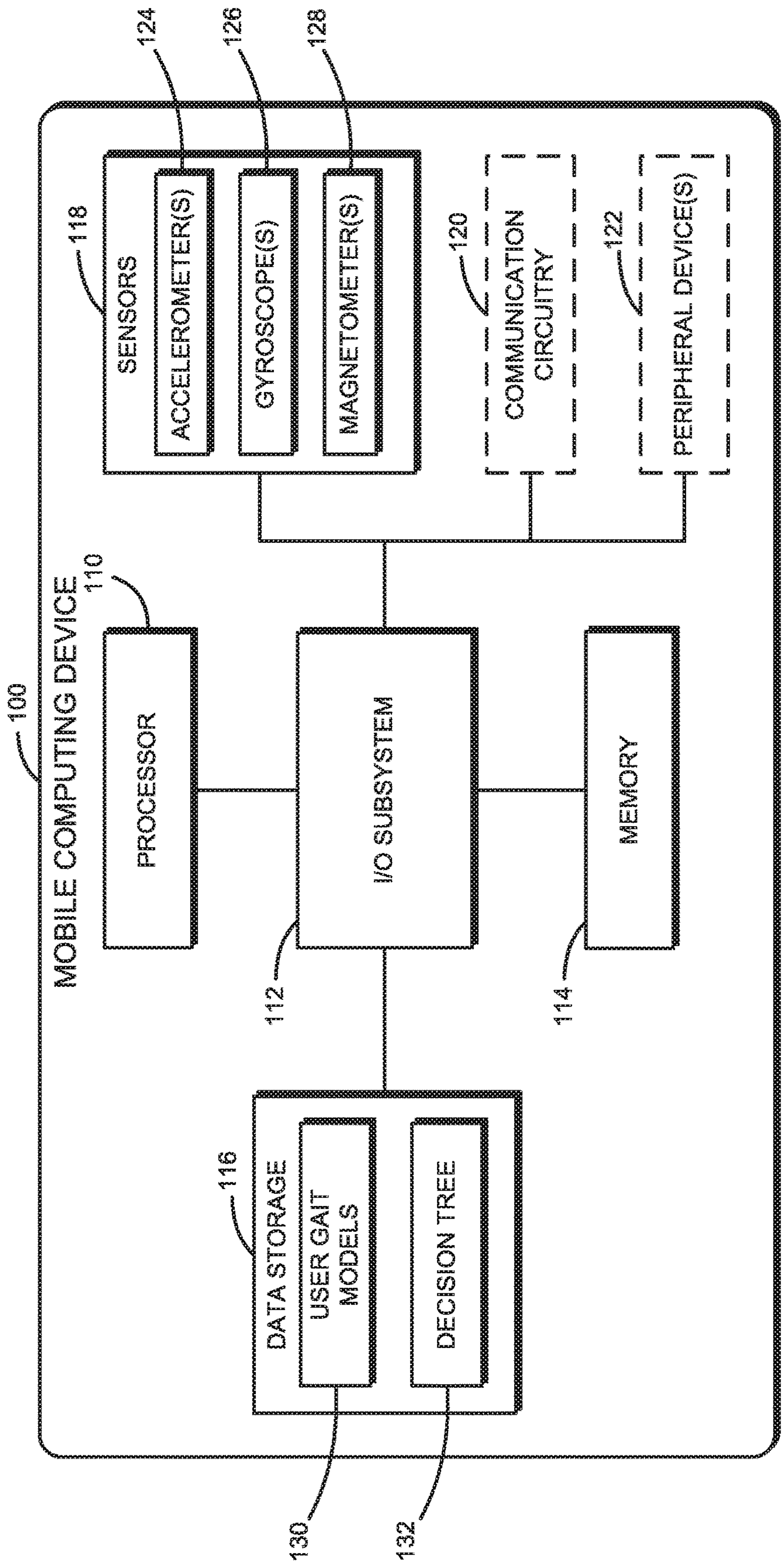
FIG. 1 is a simplified block diagram of at least one embodiment of a mobile computing device for determining a user's location.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment." "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a mobile computing device 100 for determining a user's location using pedestrian dead reckoning techniques is shown. In use, as described in more detail below, the mobile computing device 100 is configured to collect and process sensor data from a plurality of sensors of the mobile computing device 100. For example, the sensors may collect data associated with the acceleration, orientation, and/or other inertial characteristics of the mobile computing device 100 (e.g., magnetic fields). Based on an analysis of the sensor data, the mobile computing device 100 determines points in time at which the user of the mobile computing device 100 has taken a physical step (e.g., while walking). The mobile computing device 100 determines various headings of the user (e.g., raw heading, estimated heading, etc.), orientations of the mobile computing device 100 and user (e.g., relative to one another and/or to previous orientations), and a distance traveled by the user (e.g., based on the user's estimated step length). Further, the mobile computing device 100 may determine whether the user has a normal walking gait (e.g., walking with the mobile computing device 100 held in approximately the same position such as to the user's side) or a swing walking gait (e.g., walking while swinging the mobile computing device 100 back and forth at the user's side). Additionally, the mobile computing device 100 may determine whether the user is in the vicinity of a pocket of significant magnetic distortion. As described herein, it will be appreciated that the mobile computing device 100 may utilize different techniques for estimating the user's location depending on the user's walking gait and/or whether significant magnetic distortion has been identified. It should further be appreciated that the technologies described herein are useful and equally apply to both indoor and outdoor location tracking.

The mobile computing device 100 may be embodied as any type of computing device capable of performing the functions described herein. For example, the mobile computing device 100 may be embodied as a smartphone, cellular phone, wearable computing device, personal digital assistant, mobile Internet device, tablet computer, netbook, notebook, ultrabook, laptop computer, and/or any other mobile computing/communication device. As shown in FIG. 1, the illustrative mobile computing device 100 includes a processor 110, an input/output ("I/O") subsystem 112, a memory 114, a data storage 116, and one or more sensors 118. Of course, the mobile computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. In the illustrative embodiment, the data storage 116 and/or the memory 114 may store one or more user gait models 130, a decision tree 132, derived data (e.g., user location waypoints), and/or various other data useful during operation of the mobile computing device 100 as discussed below, for example, in regard to FIG. 2.

In the illustrative embodiment, the sensors 118 may be embodied as any type of sensors capable of generating, producing, or collecting data associated with the acceleration, orientation, and/or other inertial characteristics of the mobile computing device 100. Of course, in some embodiments, the sensors 118 may collect other data that may be used by the mobile computing device 100 in performing the functions described herein. In various embodiments, the sensors 118 may be embodied as, or otherwise include, for example, inertial sensors, proximity sensors, optical sensors, light sensors, audio sensors, temperature sensors, motion sensors, piezoelectric sensors, pressure sensors, and/or other types of sensors that generate data useful in determining the location of a user of the mobile computing device 100 as discussed in more detail below. For example, in the illustrative embodiment, the sensors 118 include one or more accelerometers 124, one or more gyroscopes 126, and one or more magnetometers 128. Each of the accelerometers 124 may be embodied as any sensor, circuitry, and/or other components configured to measure acceleration and/or other motion of the mobile computing device 100 (e.g., along each of the three-dimensional axes of the mobile computing device 100). Each of the gyroscopes 126 may be embodied as any sensor, circuitry, and/or other components configured to measure the angular orientation of the mobile computing device 100 relative to a predefined coordinate system. That is, the gyroscope 126 may measure the roll, pitch, and/or yaw of the mobile computing device 100. Each of the magnetometers 128 may be embodied as any sensor, circuitry, and/or other components configured to measure the magnetic field (e.g., a compass) and/or other information useful in determining the direction in which the mobile computing device 100 is pointing (e.g., with respect to due North). Of course, the mobile computing device 100 may also include components and/or devices configured to facilitate the use of the sensors 118 (e.g., an inertial measurement unit). As described below, in some embodiments, the mobile computing device 100 may include one inertial measurement unit (IMU) to generate measurements/determinations if magnetic distortion has been identified (e.g., without using a magnetometer) and another IMU to generate measurements/determinations if magnetic distortion has not been identified.

In some embodiments, the mobile computing device 100 may also include communication circuitry 120. The communication circuitry 120 may be embodied as any communication circuit, device, or collection thereof, capable of enabling communications between the mobile computing device 100 and other remote devices over a network (not shown). The communication circuitry 120 may be configured to use any one or more communication technologies (e.g., wireless or wired communications) and associated protocols (e.g., Ethernet, Bluetooth®, Wi-Fi®, WiMAX, etc.) to effect such communication depending on, for example, the type of network, which may be embodied as any type of communication network capable of facilitating communication between the mobile computing device 100 and remote devices.

The mobile computing device 100 may also include one or more peripheral devices in some embodiments. The peripheral devices 122 may include any number of additional peripheral or interface devices. The particular devices included in the peripheral devices 122 may depend on, for example, the type and/or intended use of the mobile computing device 100.

Figure 2:
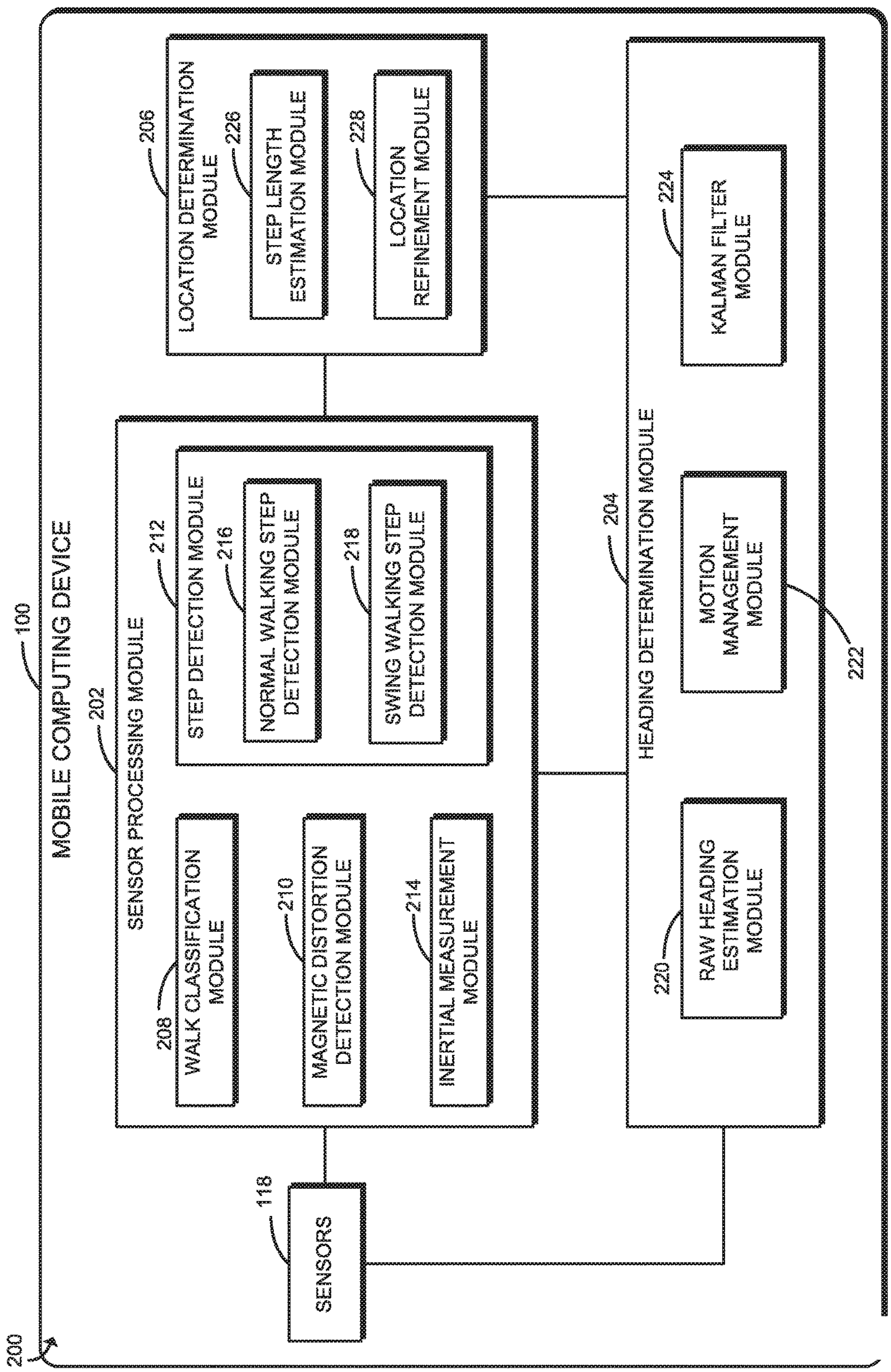
FIG. 2 is a simplified block diagram of at least one embodiment of an environment of the mobile computing device of FIG. 1.

Referring now to FIG. 2, in use, the mobile computing device 100 establishes an environment 200 for determining a user's location. As discussed below, the mobile computing device 100 estimates the user's heading and determines an estimated location of the user based on the user's estimated heading, an estimated step length of the user, and a previous location of the user (e.g., the location of the user prior to taking the step for which the user's heading was calculated). It should be appreciated that, in some embodiments, the mobile computing device 100 may determine the user's heading and/or estimate the location of the user in response to each physical step of the user. As described in greater detail below, the mobile computing device 100 may account for magnetic distortion and/or various movements of the mobile computing device 100 by the user (e.g., swing walking, tilting, rotating, etc.). Additionally, the determined heading for one or more steps of the user and/or determined location(s) of the user may be ignored or otherwise refined based on various criteria.

The illustrative environment 200 of the mobile computing device 100 includes a sensor processing module 202, a heading determination module 204, and a location determination module 206. Additionally, the sensor processing module 202 includes a walk classification module 208, a magnetic distortion detection module 210, a step detection module 212, and an inertial measurement module 214. As shown, the illustrative step detection module 212 includes a normal walking step detection module 216 and a swing walking step detection module. Additionally, the illustrative heading determination module 204 includes a raw heading estimation module 220, a motion management module 222, and a Kalman filter module 224. Further, the location determination module 206 includes a step length estimation module 226 and a location refinement module 228.

Figure 11:
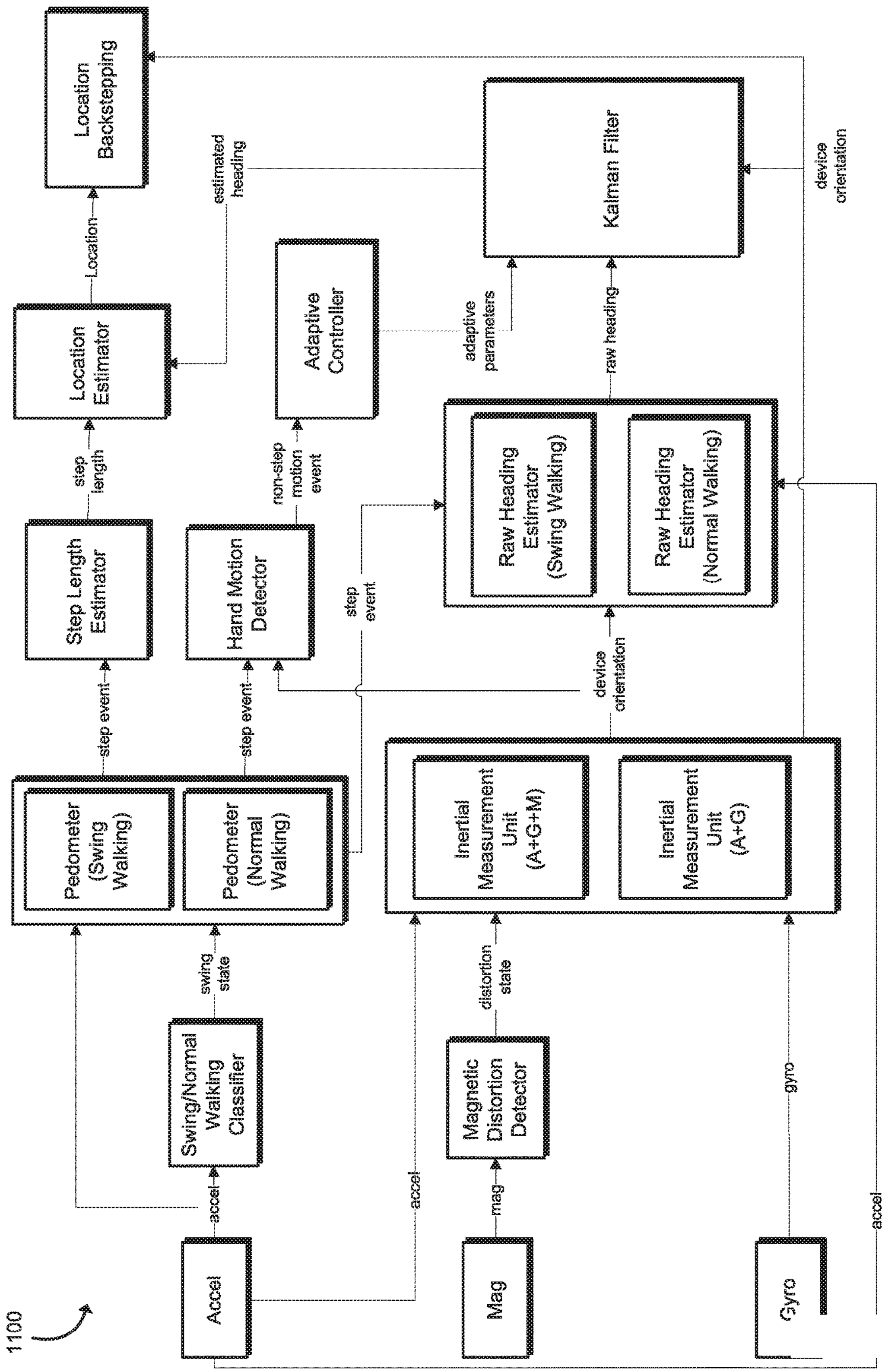
FIG. 11 is a simplified block diagram of at least one embodiment of an environment of the mobile computing device of FIG. 1.

Each of the modules of the environment 200 may be embodied as hardware, software, firmware, or a combination thereof. For example, the various modules, logic, and other components of the environment 200 may form a portion of, or otherwise be established by, the processor 110 or other hardware components of the mobile computing device 100. As such, in some embodiments, one or more of the modules of the environment 200 may be embodied as a circuit or collection of electrical devices (e.g., a sensor processing circuit, a heading determination circuit, a location determination circuit, a walk classification circuit, a magnetic distortion circuit, a step detection circuit, an inertial measurement circuit, a normal walking step detection circuit, a swing walking step detection circuit, a raw heading estimation circuit, a motion management circuit, a Kalman filter circuit, a step length estimation circuit, and/or a location refinement circuit). Additionally, in some embodiments, one or more of the illustrative modules may form a portion of another module and/or one or more of the illustrative modules may be independent of one another. Further, in some embodiments, one or more of the modules may be omitted from the environment 200 (e.g., the motion management module 222, the Kalman filter module 224, and/or the location refinement module 228). In some embodiments, the mobile computing device 100 may alternatively include an environment 1100 as shown in FIG. 11, which includes modules/circuits similar to the modules/circuits of the environment 200. As such, the descriptions of each of those modules/circuits have been omitted for clarity of the description.

The sensor processing module 202 analyzes or processes the data collected by the sensors 118. As indicated above, the illustrative sensor processing module 202 includes the walk classification module 208, the magnetic distortion detection module 210, the step detection module 212, and the inertial measurement module 214. The walk classification module 208 is configured to classify the user's gait. In particular, in the illustrative embodiment, the walk classification module 208 determines whether the user's walking gait is indicative of normal walking or swing walking. As described herein, "normal walking" may involve the user walking while holding the mobile computing device 100 to the user's side or in another steady position relative to the user's body or torso, whereas "swing walking" may involve the user swinging the mobile computing device 100 (e.g., in a pendular motion) along the user's side, forward and backward, and/or in another suitable direction. Although only two walking classifications are described herein, the walk classification module 208 may utilize additional and/or alternative classifications for the user's gait in other embodiments.

In some embodiments, the walk classification module 208 may classify the walking gait of the user based on the decision tree 132 or a suitable probabilistic model, which may be stored in the data storage 116 as discussed above. It should be appreciated that the decision tree 132 may be generated by the mobile computing device 100 or another computing device based on a set of training data (e.g., extracted during several occasions in which a user was known to be normal walking or swing walking). In particular, a machine-learning algorithm may be utilized to generate the decision tree 132. The walk classification module 208 may analyze various sensed characteristics of the user's gait, which may be configured to correlate a user's gait in terms of inertial characteristics with a normal walking gait or a swing walking gait. In some embodiments, the decision tree 132 may utilize a plurality of parameters/features including, for example, an average interval of pendular motion of the mobile computing device 100, an average peak of pendular motion of the mobile computing device 100, an amount of axial motion of the mobile computing device 100 in a predefined period of time, and/or other suitable parameters.

The magnetic distortion detection module 210 is configured to determine whether to utilize magnetometric measurements (e.g., magnetic field data) in determining the directional heading (e.g., the raw directional heading) of the user. For example, in some embodiments, the magnetic distortion detection module 210 may determine whether the mobile computing device 100 is in the vicinity of a magnetic field with a large magnitude (e.g., that causes magnetic distortion above an acceptable threshold). If so, the magnetic distortion detection module 210 may determine not to utilize magnetometric measures (e.g., relying only on acceleration and orientation/gyroscopic inertial data).

The step detection module 212 detects when the user takes a physical step. As indicated above, the illustrative step detection module 212 includes the normal walking step detection module 216 and the swing walking step detection module 218. In the illustrative embodiment, the step detection module 212 determines whether to utilize the normal walking step detection module 216 or the swing walking step detection module 218 based on the classification of the user's walking gait as a normal walking gait or a swing walking gait. In some embodiments, the normal walking step detection module 216 and the swing walking step detection module 218 may operate in parallel, and the step detection module 212 may select the appropriate module 216, 218 based on a determination of the walk classification module 208 accordingly.

In the illustrative embodiment, the normal walking step detection module 216 determines whether the user has taken a physical step based on sensor data collected from the accelerometer 124 (e.g., by analyzing changes in the magnitude of the acceleration of the mobile computing device 100). In other embodiments, the normal walking step detection module 216 may detect physical steps of the user based on sensor data collected by another set of sensors 118. It should be appreciated that, in some embodiments, the step detection module 212 may be embodied as a pedometer or a similar module.

Figure 10:
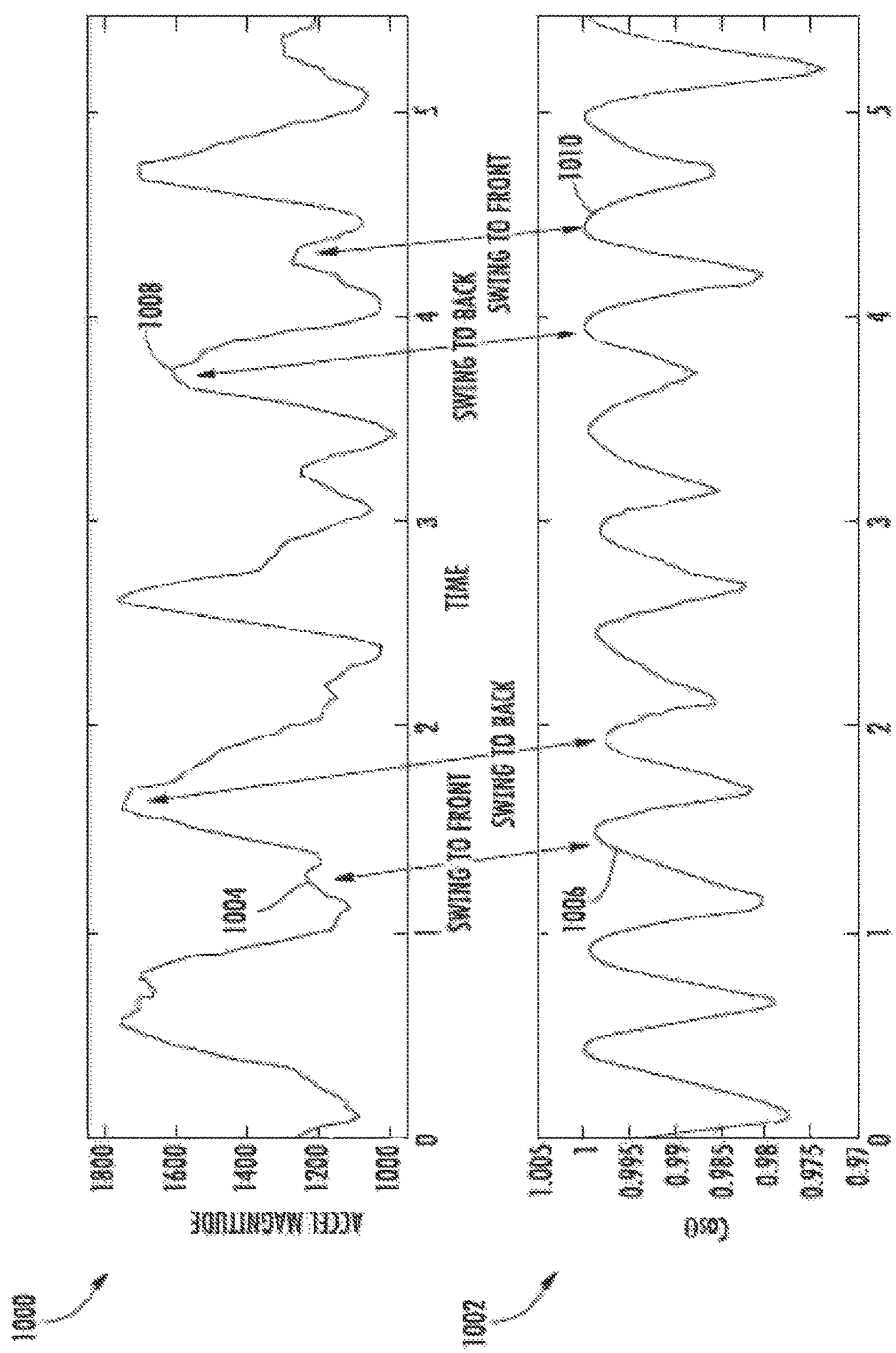
FIG. 10 is a set of simplified diagrams for user step detection.

The swing walking step detection module 218 also determines whether the user has taken a physical step based on sensor data collected from the accelerometer 124. In particular, as shown in FIG. 10 and described below, the swing walking step detection module 218 may apply a first low-pass filter (e.g., with a high cutoff frequency) to the sensed acceleration of the mobile computing device 100 to generate a first acceleration function and a second low-pass filter (e.g., with a low cutoff frequency) to the acceleration to generate a second acceleration function. Further, the swing walking step detection module 218 may determine a sinusoidal function based on the first acceleration function and the second acceleration function and identify each peak of the sinusoidal function as corresponding with a different physical step. In some embodiments, the first acceleration function (i.e., based on a high cutoff frequency) may be a sinusoidal waveform, and the second acceleration function (i.e., based on a low cutoff frequency) may be indicative of the average acceleration of the user during walking.

More specifically, in some embodiments, the swing walking step detection module 218 may determine the first acceleration according to $S_{A(k)}=\gamma_1*a_{mag(k)}+(1-\gamma_1)*a_{mag(k-1)}$, the second acceleration function according to $S_{B(k)}=\gamma_2*a_{mag(k)}+(1-\gamma_2)*a_{mag(k-1)}$, and the sinusoidal function according to $\cos(\theta_k)=|S_{A(k)}*S_{B(k)}|/(|S_{A(k)}|*|S_{B(k)}|)$ such that $S_{A(k)}$ is the first acceleration function, $S_{B(k)}$ is the first acceleration function, $\gamma_1$ is a filter parameter of the first low-pass filter, $\gamma_{21}$ is a filter parameter of the second low-pass filter, $a_{mag(k)}$ is a magnitude of the acceleration at a step k, and $a_{mag(k-1)}$ is a magnitude of the acceleration at a previous step k−1. It should be appreciated that the angle θ is indicative of an angle between the user's arm and a direction of gravity in the illustrative embodiment. In some embodiments, the filter parameters may be equal to one eighth and one thirty-second.

As shown in FIG. 10, a graph 1000 plots the magnitude of acceleration of the mobile computing device 100 over time and a graph 1002 plots the sinusoidal function, $\cos(\theta_k)$, over time during swing walking. It should be appreciated that, in some embodiments, the peaks in the graph 1000 based on acceleration are not as pronounced as the peaks in the graph 1002 based on the sinusoidal function. In some embodiments, the swing walking step detection module 218 may identify each of the peaks of one or more of the graphs 1000, 1002 to be indicative of a physical step of the user during swing walking. Further, in some embodiments, the graphs 1000, 1002 may also be utilized to determine points in time in which the user is swinging the mobile computing device 100 forward or backward. For example, in some embodiments, a small peak 1004 in the graph 1000 immediately followed by a peak 1006 in the graph 1002 may be indicative of swinging the mobile computing device 100 forward, whereas a large peak 1008 in the graph 1000 immediately followed by a peak 1010 in the graph 1002 may be indicative of swinging the mobile computing device backward. Of course, it should be appreciated that the swing walking step detection module 218 may utilize other suitable techniques for detecting the user's step during swing walking in other embodiments.

Referring back to FIG. 2, the inertial measurement module 214 is configured to process the sensor data associated with inertial characteristics of the mobile computing device 100. For example, the inertial measurement module 214 may convert the sensor data into a format usable by the heading determination module 204. In some embodiments, the inertial measurement module 214 may be embodied as one or more inertial measurement units (IMUs) configured to process data collected by the accelerometer(s) 124, the gyroscope(s) 126, the magnetometer(s) 128, and/or other sensors 118 of the mobile computing device 100 to determine movement characteristics of the mobile computing device 100 such as, for example, acceleration, tilt, and orientation.

As discussed herein, in some embodiments, the inertial measurement module 214 may include a first IMU that utilizes accelerometer 124 and gyroscope 126 data (but not magnetometer 128 data) if significant magnetic distortion (i.e., distortion above a threshold) is identified and a second IMU that utilizes data from the accelerometer 124, the gyroscope 126, and the magnetometer 128 if such magnetic distortion is not identified. In some embodiments, the first IMU may be embodied as a rotation vector sensor. Depending on the particular embodiment, the IMUs may run in parallel or the inertial measurement module 214 may select the proper IMU and then generate data accordingly. In other embodiments, a single IMU may be utilized and the inertial measurement module 214 may ignore the magnetometer 128 data in circumstances in which the magnetic distortion is present. It should be appreciated that the inertial measurement module 214 may be embodied as an independent module or form a portion of one or more other modules/circuits of the mobile computing device 100.

The heading determination module 204 analyzes various data to estimate a heading of the user, which may be used by the location determination module 206 to determine and/or track the location of the user. As discussed above, in the illustrative embodiment, the heading determination module 204 includes the raw heading estimation module 220, the motion management module 222, and the Kalman filter module 224.

The raw heading estimation module 220 determines a "raw" heading of the mobile computing device 100 based on the sensed inertial characteristics of the mobile computing device 100 and/or processed sensor data (e.g., from the inertial measurement module 214) and an indication that the user has taken a physical step (e.g., from the step detection module 212). In the illustrative embodiment, the raw heading estimation module 220 determines the directional heading of the mobile computing device 100 and/or the user and an orientation of the mobile computing device 100 relative to a previous orientation of the mobile computing device 100 based on, for example, sensed inertial characteristics of the mobile computing device 100. For example, the raw heading estimation module 220 may determine a variation in the orientation of the mobile computing device 100 at a current step relative to the orientation of the mobile computing device 100 at a previous step (e.g., the user's next to last step).

As described below, in some embodiments, the raw heading estimation module 220 converts a sensed acceleration of the mobile computing device 100 to Earth's frame of reference and integrates the acceleration to determine a directional velocity of the mobile computing device 100. It should be appreciated that, in some circumstances, the raw heading estimation module 220 assumes the mobile computing device 100 and the user travel with the same velocity and, therefore, an estimation of the magnitude and/or direction of the velocity of the mobile computing device 100 may approximate the magnitude and/or direction of the velocity of the user. In the illustrative embodiment, the directional heading of the mobile computing device 100 is determined as, or otherwise based on, the direction of the determined velocity of the mobile computing device 100. However, in other embodiments, the magnitude of the determined velocity of the mobile computing device 100 may also be used in determining the directional heading of the mobile computing device 100. As described below, the raw heading estimation module 220 may determine the velocity based on the user gait model 130 (e.g., normal walking gait model or swing walking gait model) corresponding with the user's current walking gait.

In some cases, the user may hold the mobile computing device 100 in front of her such that the mobile computing device 100 is maintained in a fixed orientation relative to the user. In those circumstances, the movement of the mobile computing device 100 is generally limited to step motions (i.e., related to the stepping movements of the user). However, in typical circumstances, the user may hold the mobile computing device 100 in a casual manner such that the mounting position (i.e., orientation in which the mobile computing device 100 is held) may change over time. For example, the user may turn the mobile computing device 100 from a portrait orientation (i.e., zero degrees relative to the user) to a landscape orientation (i.e., ninety degrees relative to the user), place the mobile computing device 100 in her pocket, tilt the mobile computing device 100 (e.g., forward/down or backward/up), swing the mobile computing device 100 while walking (e.g., to the user's side), and/or otherwise reposition the mobile computing device 100. It should be appreciated that typical PDR implementations have difficulty in handling such non-step motions while minimizing/reducing error (i.e., when compared to a ground truth).

The motion management module 222 accounts for various non-step motions (e.g., tilt and rotation of the mobile computing device 100 by the user) to enable the heading determination module 204 to more accurately estimate the user's heading. To do so, the motion management module 222 may detect hand motion of the user. In particular, in the illustrative embodiment, if the motion management module 222 detects tilt (i.e., rotation in a non-horizontal plane) of the mobile computing device 100 relative to an orientation of the mobile computing device 100 at a previous step, the motion management module 222 ignores the detected physical step. As described below, the mobile computing device 100 may utilize a Kalman filter to estimate the user's heading. In other words, the motion management module 222 may prevent data associated with the detected step from being processed by the Kalman filter, or the Kalman filter otherwise rejects the data. If the mobile computing device 100 has no relative tilt in the subsequent step, the motion management module 222 may again allow data to be transmitted to and processed by the Kalman filter. It should be appreciated that, in some embodiments, the motion management module 222 may establish a threshold amount of relative tilt by which the motion must exceed to ignore the step. Such embodiments may account for small amounts of tilt common with, for example, a stepping motion and/or motion that does not affect the accuracy of the heading estimation. In some embodiments, if not compensated for as described herein, such motions causing the mobile computing device 100 to tilt can result in a state transition error, $\varepsilon_k$, that does not approximate Gaussian or white noise.

The motion management module 222 also accounts for rotational motion along a horizontal plane. It should be appreciated that large rotational movements of the mobile computing device 100 along the horizontal plane may or may not be associated with the user's movement and, therefore, with the user's heading. For example, a large rotational movement (e.g., ninety degrees) may be associated with the user making a turn, the user spinning the mobile computing device 100 relative to herself, or a combination of those movements. If there is no tilt associated with the horizontal rotation and/or tilt not exceeding a reference threshold, the motion management module 222 does not prevent the data from being processed by the Kalman filter as described above.

It should be appreciated that, if otherwise left unaccounted for, movements of the mobile computing device 100 relative to the user may lead to inaccurate heading estimations for the user. In the illustrative embodiment, if the horizontal rotational motion exceeds a reference threshold (e.g., seventy-five degrees, ninety degrees, one hundred degrees, etc.), the motion management module 222 no longer trusts the measurements associated with the relative orientation ($O_k-O_{k-1}$) of the mobile computing device 100 as described below. In one particular embodiment, the reference threshold is ninety degrees of rotation as a ninety degree turn in a single physical step is unnatural and therefore uncommon. As such, the motion management module 222 reinitializes the Kalman filter and increases the Kalman filter's tolerance in error by increasing the state covariance, P, of the filter. In other words, the motion management module 222 may act as an adaptive controller to handle, at least in part, the initialization and parameters of the Kalman filter described below. It should further be appreciated that, in some circumstances, the motion management module 222 may not (or may not fully) account for the non-step motions of the mobile computing device 100.

The Kalman filter module 224 is configured to apply a Kalman filter to determine a heading of the user based on the raw heading of the mobile computing device 100 and a variation in orientation of the mobile computing device 100 (i.e., an orientation of the mobile computing device 100 relative to the orientation at the previous step). As described above, the Kalman filter module 224 may reject various data from the Kalman filter (e.g., in conjunction with the motion management module 222) and may initialize (e.g., prior to the first measured/detected step of the user) and/or reinitialize the Kalman filter at various points in time. In the illustrative embodiment, the Kalman filter module 224 applies the Kalman filter to estimate the real-time heading of the user based on an illustrative PDR model, which is described in reference to FIG. 3 below.

Figure 3:
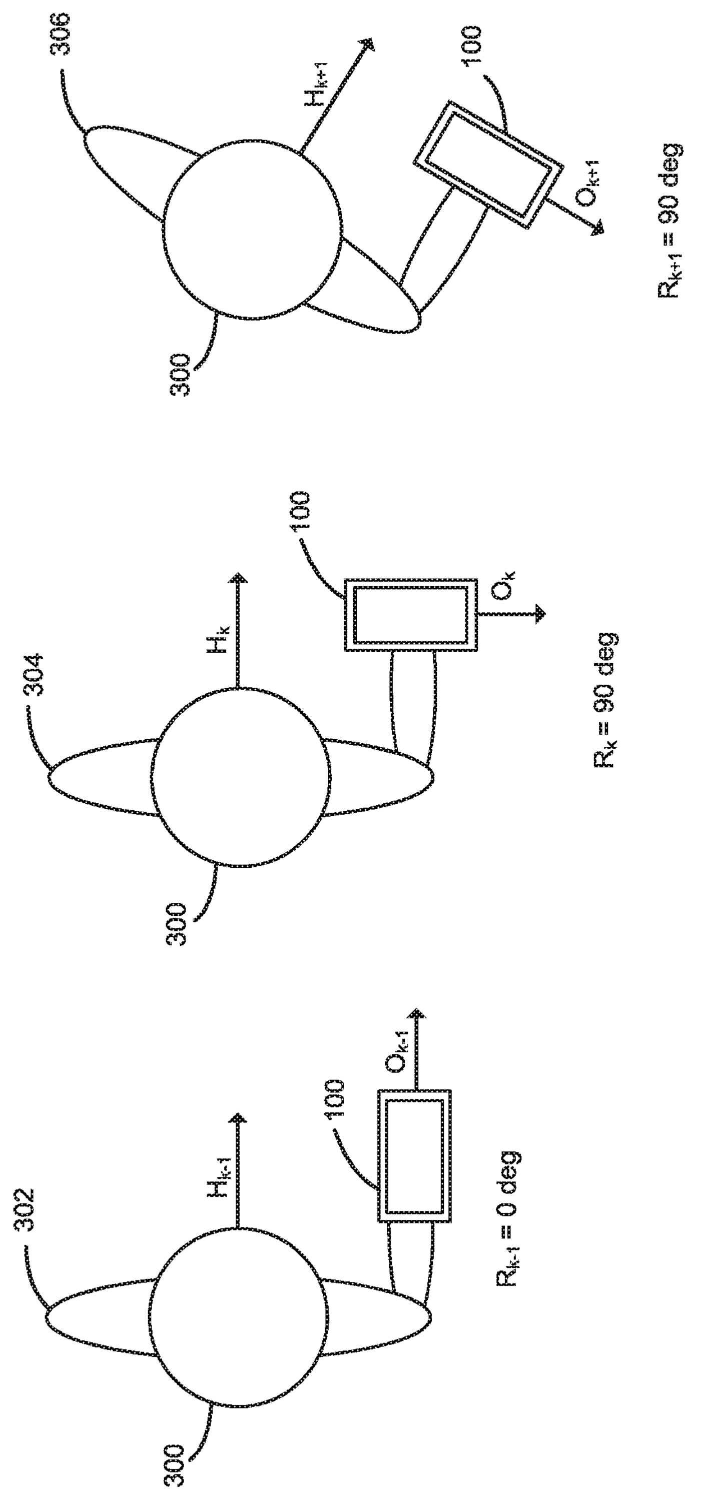
FIG. 3 are simplified illustrations of a user holding the mobile computing device of FIG. 1 in various orientations.

Referring now to FIG. 3, a user 300 is shown at different physical steps 302, 304, 306 with various headings ($H_{k-1}$, $H_k$, $H_{k+1}$) and holding the mobile computing device 100 in various orientations ($O_{k-1}$, $O_k$, $O_{k+1}$) relative to a frame of reference. In the illustrative steps 302, 304, 306, it should be appreciated that $O_k$ is the orientation of the mobile computing device 100 in the horizontal plane in step k, $H_k$ is the user's heading in step k, and $R_k$ is the relative angle between the device orientation and the user's heading in step k. More specifically, at a first step 302, the user 300 has a heading, $H_{k-1}$, of zero degrees relative to the frame of reference, the mobile computing device 100 has an orientation, $O_{k-1}$, of zero degrees, and the relative angle, $R_{k-1}$, defined therebetween is zero degrees. At a second step 304, the user 300 has a heading, $H_k$, of zero degrees, the mobile computing device 100 has an orientation, $O_k$, of ninety degrees, and the relative angle, $R_k$, is ninety degrees. Further, at a third step 306, the user 300 has a heading, $H_{k+1}$, of forty-five degrees, the mobile computing device 100 has an orientation, $O_{k+1}$, of 135 degrees and the relative angle, $R_{k+1}$, is ninety degrees.

It should be appreciated that $H_k=O_k+R_k$ at step k, and the user's heading variation in step k may be calculated in the PDR model according to $H_k-H_{k-1}=(O_k-O_{k-1})+(R_k-R_{k-1})$. In the illustrative PDR model, $O_k-O_{k-1}$, represents the variation in the orientation of the mobile computing device 100 in step k (i.e., relative to step k−1) and may be determined by the inertial measurement module 214 based on the sensed inertial characteristics of the mobile computing device 100. Further, $R_k-R_{k-1}$, represents the variation in the relative angle between the user 300 and the mobile computing device 100 in step k (i.e., relative to step k−1). In most circumstances, $R_k-R_{k-1}$ is zero because most users do not frequently change the mounting position/direction of the mobile computing device 100 during PDR.

It should be appreciated that the Kalman filter may be applied to estimate a filter state, $x_k$, based on a defined state transition function and a measurement function, $y_k$. In the illustrative embodiment, the filter state, $x_k$, is defined as the user's heading, $H_k$. In other words, $x_k=H_k$. Based on the PDR model described above, the state transition function is defined as $x_k=x_{k-1}+O_k-O_{k-1}+\varepsilon_k$, where $\varepsilon_k$ is a state transition error at step k. Additionally, as described above, $x_k$ is the determined heading of the user at step k, and $O_k$ is an orientation of the mobile computing device 100 at step k. In the illustrative embodiment, the state transition error includes the measurement error associated with determining $O_k-O_{k-1}$, and the position/direction change error, $R_k-R_{k-1}$, of the mobile computing device 100. It should be appreciated that, in the illustrative embodiment, the Kalman function assumes $R_k-R_{k-1}=0$ (e.g., to ensure stability of the filter). However, because that may not be the case, the motion management module 222 may handle the circumstances in which $R_k-R_{k-1}\neq 0$ as described above. Additionally, the measurement function, $y_k$, may be defined as $y_k=x_k+\delta_k$, where $y_k$ is the raw heading of the mobile computing device 100 as described above and $\delta_k$ is a measurement error associated with integration of the acceleration of the mobile computing device 100.

Returning to FIG. 2, in the illustrative embodiment, the Kalman filter module 224 may determine an estimated heading of the user by applying a linear Kalman filter having the state transition function, $x_k=x_{k-1}+O_k-O_{k-1}+\varepsilon_k$, and a measurement function, $y_k=x_k+\delta_k$, as described above. In other embodiments, the Kalman filter module 224 may apply other variations of the Kalman filter to determine the heading of the user. For example, in some embodiments, the Kalman filter module 224 may apply a Kalman filter having the state transition function, $x_k=H_k-H_{k-1}=O_k-O_{k-1}+\varepsilon_k$, and a measurement function, $y_k=x_k+H_{k-1}+\delta_k$, where $H_k$ is the estimated heading of the user at step k, $x_k$ is the estimated heading change at step k, $O_k$ is an orientation of the mobile computing device at step k, $\varepsilon_k$ is a state transition error at step k, $y_k$ is the determined directional heading (e.g., directional velocity) of the mobile computing device at step k, and $\delta_k$ is a measurement error associated with integration of an acceleration of the mobile computing device at step k. In yet other embodiments, the Kalman filter module 224 and/or the heading determination module 204 may, additionally or alternatively, apply another filter (e.g., another discrete filter for estimation) based on the PDR model described above.

The location determination module 206 determines an estimated location of the user based on the determined heading of the user, an estimated step length of the user, and the user's location at the previous physical step. For example, the location determination module 206 may determine that the user is located a distance corresponding with the user's step length away from the previous location in the direction of the user's determined heading. As discussed above, in the illustrative embodiment, the location determination module 206 includes the step length estimation module 226 and the location refinement module 228.

The step length estimation module 226 determines the estimated step length of the user based on a user gait model 130. Depending on the particular embodiment, the user gait model 130 may be a general model (e.g., one-size-fits-all model) that includes an estimation of the step length of the user, or the user gait model 130 may be a user-specific model. In the illustrative embodiment, the step length estimation module 226 may select the appropriate user gait model 130 (e.g., normal or swing walking) based on whether the user is currently walking normally or swing walking as described herein. Further, in some embodiments, a user-specific user gait model 130 may be generated, or a generic model adapted, after a "training period" with the user. For example, the mobile computing device 100 may request the user to take a certain number of steps and measure the distance traveled. Additionally, in some embodiments, the user gait model 130 may include varying step lengths depending on whether the user is walking, jogging, running, or otherwise stepping, which may be determined based on an analysis of the sensor data collected by the sensors 118. In other embodiments, the step length estimation module 226 may determine the estimated step length of the user based on data collected by the sensors 118 of the mobile computing device 100 (e.g., with or without use of a user gait model 130).

The location refinement module 228 is configured to refine the estimated location of the user based on various factors. As described above, the Kalman filter may be reinitialized by the motion management module 222 and/or the Kalman filter module 224 (e.g., in response to rotational motion of the mobile computing device 100 that exceeds the reference threshold for horizontal rotational motion). It should be appreciated that, following reinitialization, the Kalman filter requires a certain period of time to converge and become stable. Therefore, the user's location determined at points of time in which the Kalman filter is converging may be inaccurate depending on the movement of the user.

As such, in the illustrative embodiment, the location refinement module 228 refines the determined estimation location of the user in response to determining that the Kalman filter has been reinitialized and has converged. For example, the location refinement module 228 may refine the estimated locations of the user for one or more of the steps following reinitialization once the user has taken a threshold number of steps following reinitialization of the Kalman filter (e.g., two steps, three steps, five steps, ten steps, twenty steps, fifty steps, etc.). In the illustrative embodiment, the location refinement module 228 "backsteps" the user's location by recalculating the user's heading from the latest step (e.g., the threshold step) back to the first step following reinitialization to update the user headings and by recalculating the user's location with the updated user headings from the first step following reinitialization to the last step taken by the user (e.g., the threshold step). After backstepping one or more times, the Kalman filter stabilizes (i.e., unless it is reinitialized again). It should be appreciated that the location refinement module 228 may otherwise refine the determined headings and/or locations of the user in other embodiments.

Figure 4:
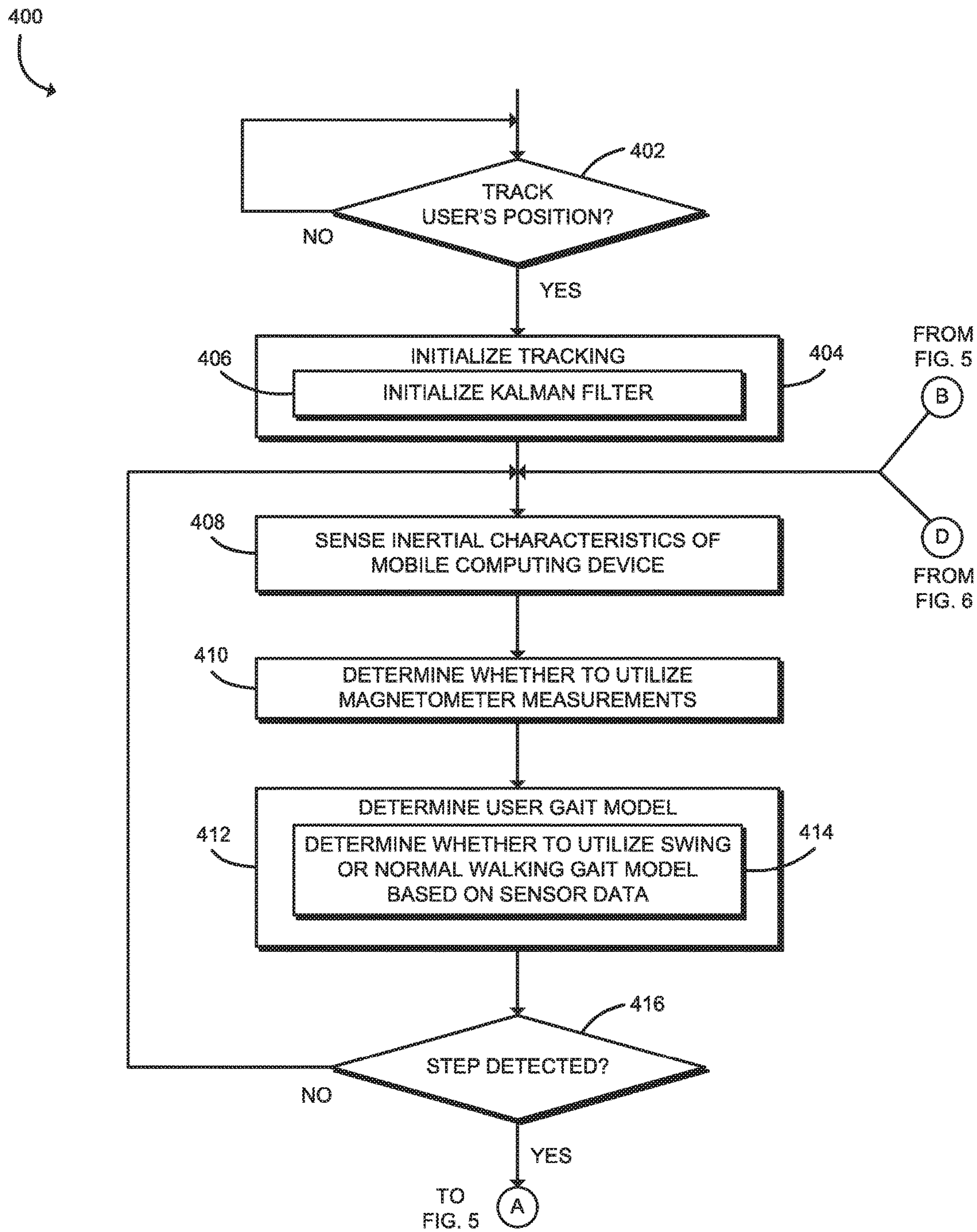
FIGS. 4-6 is a simplified flow diagram of at least one embodiment of a method for determining a user's location.
Figure 5:
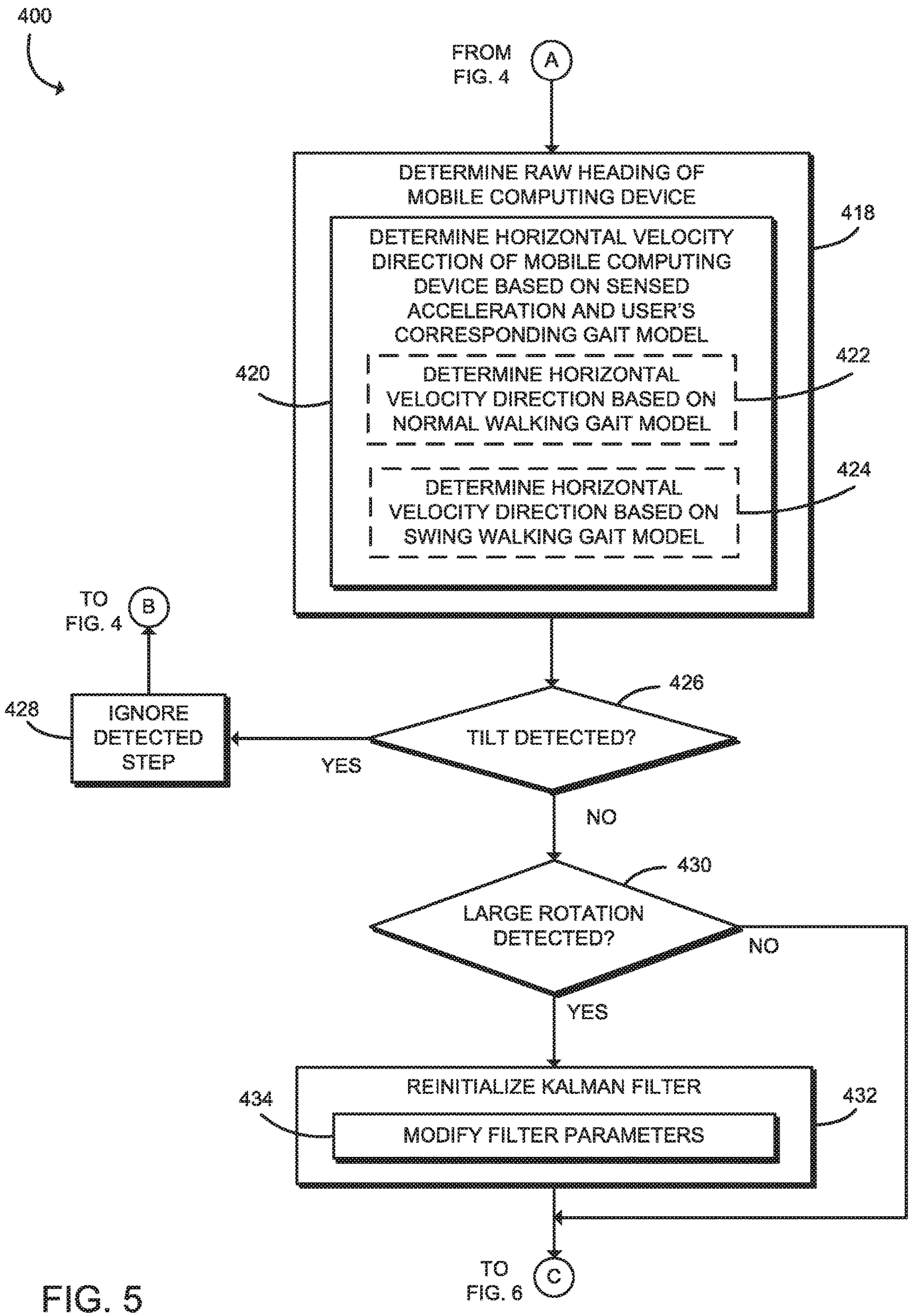
Figure 6:
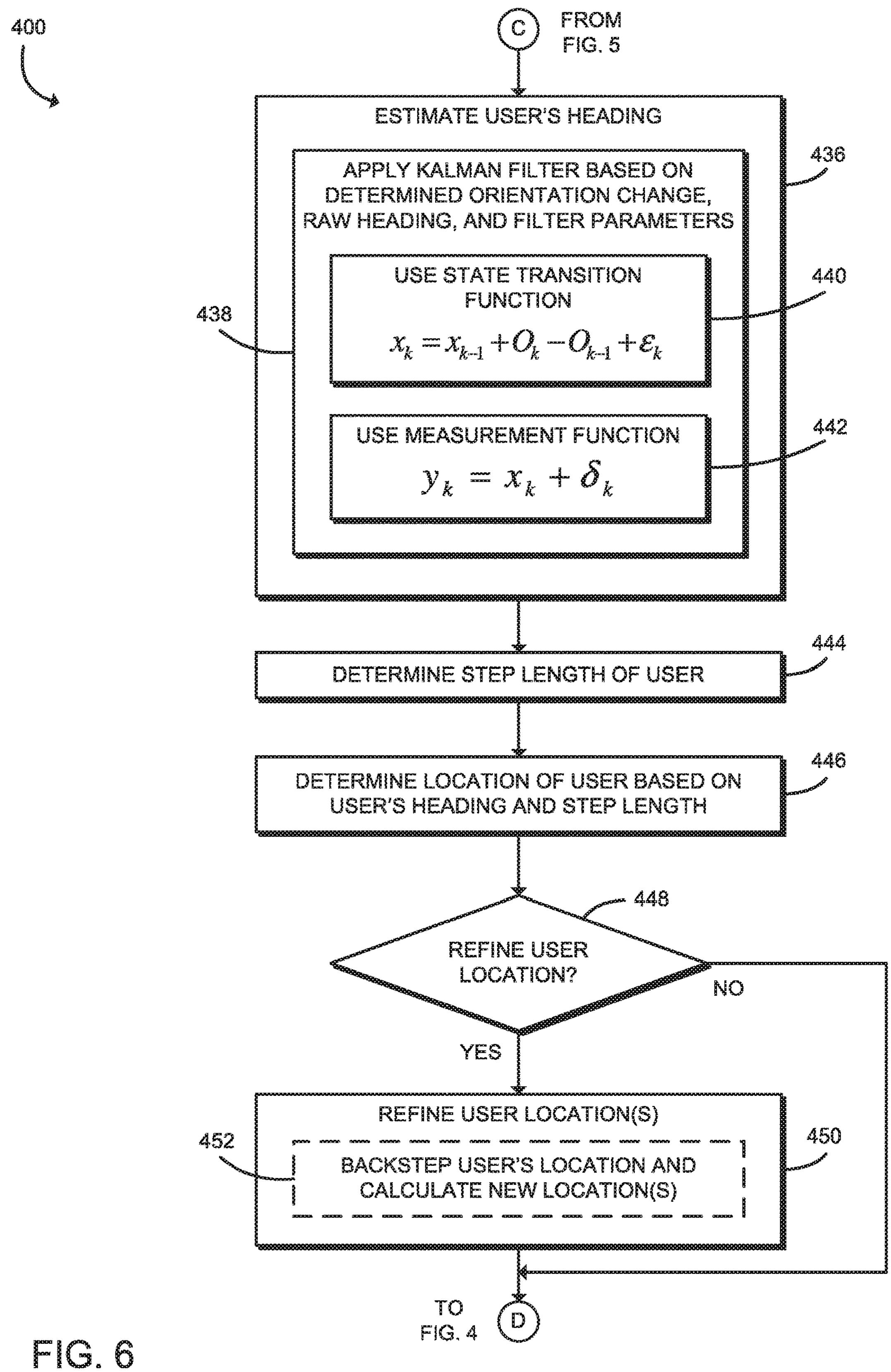

Referring now to FIGS. 4-6, in use, the mobile computing device 100 may execute a method 400 for determining a user's location (e.g., using PDR). The illustrative method 400 begins with block 402 of FIG. 4 in which the mobile computing device 100 determines whether to track the user's position/location (i.e., whether to begin PDR). If so, the mobile computing device 100 initializes tracking in block 406. For example, in block 406, the mobile computing device 100 initializes the Kalman filter based on the appropriate parameters, state transition function, and measurement function as described above. Of course, during the initialization, the mobile computing device 100 may retrieve the user gait models 130 from the memory 114 or data storage 116, initialize the sensors 118 and one or more modules of the mobile computing device 100 (e.g., the inertial measurement module 214), and/or perform other initialization and configuration procedures.

In block 408, the mobile computing device 100 senses inertial and/or other characteristics of the mobile computing device 100. For example, as discussed above, the mobile computing device 100 may sense the acceleration, angular orientation (e.g., roll, pitch, and yaw), magnetic field, and/or other inertial, directional, or other characteristics of the mobile computing device 100 (e.g., characteristics relevant to a PDR analysis).

Figure 7:
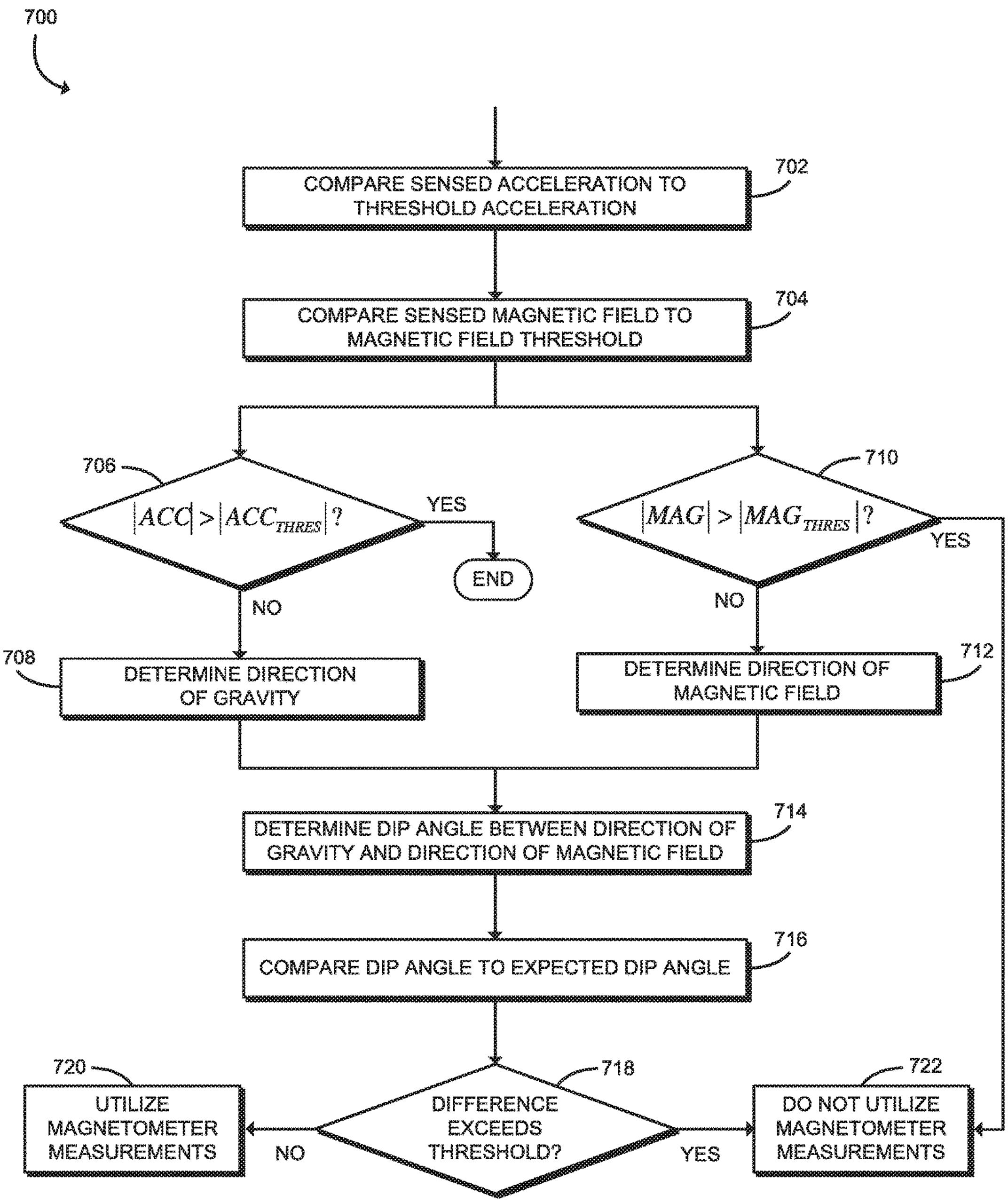
FIG. 7 is a simplified flow diagram of at least one embodiment of a method for determining whether to utilize magnetometer measurements.

In block 410, the mobile computing device 100 determines whether to utilize magnetometer measurements to determine the raw directional heading of the user based on the sensed inertial characteristics. To do so, the mobile computing device 100 may execute a method 700 for determining whether to utilize magnetometer measurements as shown in FIG. 7. The illustrative method 700 begins with block 702 in which the mobile computing device 100 compares the magnitude of the sensed acceleration of the mobile computing device 100 to a threshold acceleration value. In the illustrative embodiment, the threshold acceleration value is greater than the acceleration experienced with typical walking (e.g., approximately 1.2 times gravity). In block 704, the mobile computing device 100 compares the magnitude of a magnetic field detected by the mobile computing device 100 with a magnetism threshold value. In some embodiments, the magnetism threshold value is determined to be a value above which the mobile computing device 100 is likely experiencing magnetic distortion.

As shown in FIG. 7, in some embodiments, the mobile computing device 100 may perform blocks 706, 710 in parallel; however, the blocks 706, 710 may be performed sequentially in other embodiments. In block 706, the mobile computing device 100 determines whether the magnitude of the acceleration exceeds the acceleration threshold. If so, the mobile computing device 100 may determine to terminate the method 700 (e.g., to perform suitable error handling). It should be appreciated that, in some embodiments, an acceleration of the mobile computing device 100 that exceeds the acceleration threshold (e.g., a "violent" motion) may correspond with the acceleration data generated by the accelerometer(s) 124 being biased toward the motion such that the direction of gravity cannot be determined. However, if the mobile computing device 100 determines that the acceleration of the mobile computing device 100 does not exceed the acceleration threshold, in block 708, the mobile computing device 100 determines a direction of gravity based on the sensed inertial characteristics.

In block 710, the mobile computing device 100 determines whether the magnitude of the sensed magnetic field exceeds the magnetism threshold. If so, the mobile computing device 100 determines that significant magnetic distortion exists (e.g., as a result of a "strong" magnetic field in the vicinity of the mobile computing device 100), and the method advances to block 722 in which the mobile computing device 100 determines not to utilize the magnetometer measurements. However, if the mobile computing device 100 determines that the sensed magnetic field does not exceed the magnetism threshold, the mobile computing device 100 determines a direction of the sensed magnetic field in block 712.

In block 714, the mobile computing device 100 determines a dip angle between the direction of gravity and the direction of the magnetic field. For example, the mobile computing device 10 may determine an angle between a vector associated with gravity and a vector associated with the sensed magnetic field. It should be appreciated that such an angle may be referred to herein as a "dip angle," "magnetic inclination," or "magnetic dip." In block 716, the mobile computing device 100 compares the determined dip angle to an expected dip angle (e.g., a predetermined expected/stored value) of the mobile computing device 100. It should be appreciated that, in many embodiments, the dip angle should be relatively constant absent magnetic distortion. As such, if there is no magnetic distortion (or low magnetic distortion up to a permitted threshold), the difference between the determined dip angle and the expected dip angle should be relatively small. In block 718, the mobile computing device 100 determines whether the difference between the determined dip angle and the expected dip angle exceeds such an allowed predetermined difference threshold. If so, the mobile computing device 100 determines not to utilize the magnetometric measurements for heading estimation in block 722 (e.g., due to identified or suspected magnetic distortion). However, if the mobile computing device 100 determines that the difference does not exceed the threshold, the mobile computing device 100 may utilize the magnetic measurements (e.g., from the magnetometers 128) in estimating the user's heading.

Returning to FIG. 4, in block 412, the mobile computing device 100 determines which user gait model 130 to utilize based on the sensed inertial characteristics. In the illustrative embodiment, in block 414, the mobile computing device 100 determines whether to utilize a swing walking gait model or a normal walking gait model based on the data received from the sensors 118. It should be appreciated that, in the illustrative embodiment, the normal walking gait model 800 (see FIG. 8) and the swing walking gait model 900 (see FIG. 9)

are significantly different due, for example, to the differences in the inertial characteristics associated with those walking gaits.

Figure 8:
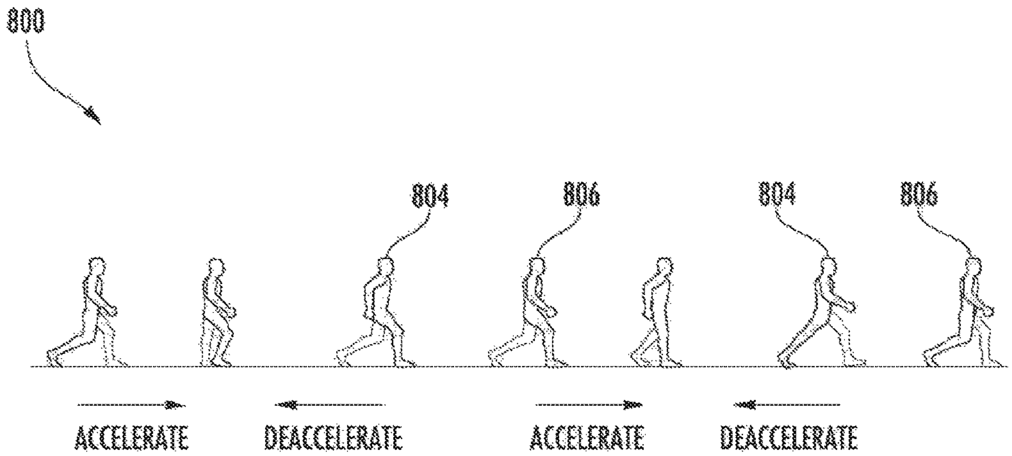
FIG. 8 is a simplified diagram of a normal walking gait model.

As shown in FIG. 8, the normal walking gait model 800 illustrates a full walking cycle that contains two heel-strike events 802 and two toe-off events 804. A heel-strike event 802 corresponds with the user touching the heel of her front foot to the ground when taking a step during a walking gait, whereas a toe-off event 804 corresponds with the user lifting the toes of her back foot from the ground when taking a step. It should be appreciated that the peak of the magnitude of acceleration (as sensed by the accelerometers 124) generally occurs at the time of a heel-strike event 802. Further, if the mobile computing device 100 is "attached" to the user's body or otherwise held in a steady position relative to the user's body (e.g., to the user's side), the mobile computing device 100 accelerates after toe-off events 804 and decelerates before heel-strike events 802. It should be appreciated that using the normal walking gait model 800 when the user is swing walking may result in error due to the different kinematics associated with swing walking. For example, the body walking data may be distorted by the hand swinging data, thereby resulting in erroneous PDR heading estimations and location determinations.

Figure 9:
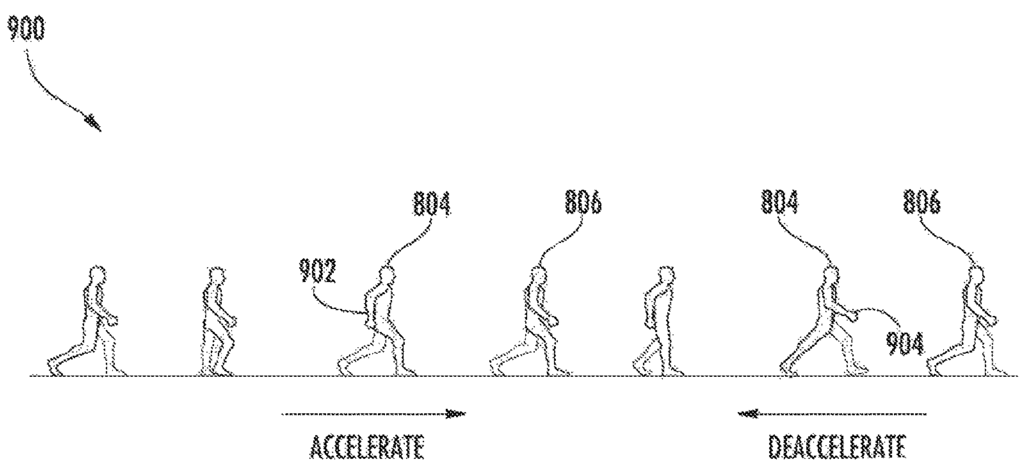
FIG. 9 is a simplified diagram of a swing walking gait model.

As shown in FIG. 9, the swing walking gait model 900 also illustrates a full walking cycle that contains two heel strike events 802 and two toe-off events 804. Additionally, the swing walking gait model 900 illustrates the swinging motion of the user's arm and, as such, also illustrates a swing-to-back event 902 in which the user swings the mobile computing device 100 to the back (i.e., toward the direction opposite her heading) and a swing-to-front event 904 in which the user swings the mobile computing device 100 to the front (i.e., toward her heading direction). It should be appreciated that the illustrative model 900 assumes the mobile computing device 100 to be held in the user's right hand, which is swinging, for example, in a pendular motion. Of course, a model similar to the model 900 may be employed in embodiments in which the user is alternatively holding the mobile computing device 100 in her left hand. In the illustrative swing walking gait model 900, the mobile computing device 100 accelerates along the walking direction (i.e., forward in the direction of the user's heading) when the user's hand swings to the back and decelerates along the walking direction when the user's hand swings to the front. Of course, it should be appreciated that the user gait model 130 may change throughout the course of the user's walk (e.g., back and forth between normal walking and swing walking). In such embodiments, the mobile computing device 100 may change the user gait model 130 when performing heading estimation accordingly.

Returning to FIG. 4, in block 416, determines when the user has taken a physical step based on the sensor data (e.g., from the IMUs) and the appropriate user gait model 130 depending on whether the user is normal walking or swing walking. The sensor data may be further analyzed to determine various characteristics (e.g., a raw heading of the mobile computing device 100) as described herein. If the mobile computing device 100 determines the user has not taken a physical step, the method 400 returns to block 408 in which the mobile computing device 100 continues to collect data from the sensors 118 of the mobile computing device 100. In other words, the mobile computing device 100 may wait until a step of the user has been detected. If the mobile computing device 100 determines the user has taken a step, the method 400 advances to block 418 of FIG. 5 in which the mobile computing device 100 determines the user's raw heading (i.e., the directional heading of the mobile computing device 100). As discussed above, in doing so, the mobile computing device 100 may determine the horizontal velocity direction of the mobile computing device 100 based on the sensed acceleration of the mobile computing device 100 in block 420. For example, in block 422, the mobile computing device 100 may determine the horizontal velocity direction of the mobile computing device 100 based on the normal walking gait model 800 and, in block 424, the mobile computing device 100 may determine the horizontal velocity direction of the mobile computing device 100 based on the swing walking gait model 900 depending on the current gait of the user.

In particular, the mobile computing device 100 senses an acceleration of the mobile computing device 100 with the sensors 118 as described above. It should be appreciated that the sensed acceleration is defined with respect to a frame of reference of the mobile computing device 100 or the sensor(s) 118 that sensed the acceleration of the mobile computing device 100. In the illustrative embodiment, the mobile computing device 100 converts the sensed acceleration from the frame of reference of the mobile computing device 100 to Earth's frame of reference by virtue of a rotation matrix that defines a mapping between the two frames of reference. For example, the new acceleration in Earth's frame of reference, $a_{et}$, may be determined according to $a_{et}=A_t a_t$, where $A_t$ is the rotation matrix and $a_t$ is the sensed acceleration by the mobile computing device. It should be appreciated that the rotation matrix may be calculated using any suitable algorithm or technique.

In the illustrative embodiment, the mobile computing device 100 determines the velocity (i.e., a vector quantity) of the mobile computing device 100 by integrating (or summing) the acceleration in Earth's frame over a short period. It will be appreciated that integration or summation over an extended period of time typically introduces significant error, $\delta_k$, as described above. Accordingly, in some embodiments, the mobile computing device 100 sums the acceleration over a very small period, $\Delta_t$, in an attempt to approximate the instantaneous velocity of the mobile computing device 100 and minimize the introduction of error. The velocity in Earth's frame of reference, $v_{et}$, may be determined according to $v_{et}=\Sigma a_{et}\Delta t$. In the illustrative embodiment, it should be appreciated that the intervals of integration depend on the particular user gait model 130 being used. As discussed above, the mobile computing device 100 accelerates during different intervals depending on whether the user is normal walking or swing walking (see FIGS. 8-9). Accordingly, in the illustrative embodiment, it should be appreciated that integration of the acceleration may result in different values depending on whether the normal walking gait model 800 or the swing walking gait model 900 is utilized.

In the illustrative embodiment, the mobile computing device 100 projects the velocity in Earth's frame of reference onto a horizontal plane (e.g., a horizontal plane coincident with a surface on which the user has stepped) to determine the horizontal velocity of the mobile computing device 100 in the direction in which the user has stepped. It will be appreciated that, in the illustrative embodiment, the determined horizontal velocity direction is the raw heading as described herein. As indicated above, in some embodiments, the directional heading of the mobile computing device 100 may ignore the magnitude of the determined horizontal velocity.

In block 426, the mobile computing device 100 determines whether a tilt (i.e., non-horizontal rotation) is detected. If so, the mobile computing device 100 ignores the detected step in block 428 and the method 400 then returns to block 408 of FIG. 4 in which the mobile computing device 100 continues to sense the inertial characteristics and waits until another step is detected. As discussed above, it should be appreciated that the mobile computing device 100 may utilize a reference threshold and only ignore the user's step if the amount of tilt exceeds the reference threshold.

If no tilt has been detected or the tilt does not exceed the reference threshold, the mobile computing device 100 determines whether a large rotation has been detected in block 430. If so, the mobile computing device 100 reinitializes the Kalman filter in block 432. In doing so, the mobile computing device 100 may modify the filter parameters in block 434. For example, as described above, the mobile computing device 100 may increase a state covariance of the Kalman filter to increase the Kalman filter's tolerance in error. As discussed above, the mobile computing device 100 may establish a reference threshold for the amount of horizontal rotational motion that constitutes a "large" rotation. In other words, if the mobile computing device 100 is rotated by an amount exceeding the threshold, the mobile computing device 100 reinitializes the Kalman filter; however, if the mobile computing device 100 is not rotated by an amount exceeding the threshold, the mobile computing device 100 does not reinitialize the Kalman filter in block 432. As described above, the mobile computing device 100 thus acts as an adaptive controller that may adjust the parameters of the Kalman filter depending on the rotational motion of the mobile computing device 100.

Regardless of whether the mobile computing device 100 reinitializes the Kalman filter, the method 400 advances to block 436 of FIG. 6 in which the mobile computing device 100 estimates the user's heading. As described above, to do so, the mobile computing device 100 may apply a Kalman filter based on the determined orientation change of the mobile computing device 100, $O_k - O_{k-1}$, the determined raw heading of the mobile computing device 100, $y_k$, and the filter parameters (e.g., the state covariance based on whether the Kalman filter has been reinitialized) in block 438. In particular, as shown in blocks 440 and 442, respectively, the mobile computing device 100 may apply a Kalman filter having a state transition function, $x_k = x_{k-1} + O_k - O_{k-1} + \varepsilon_k$, and a measurement function, $y_k = x_k + \delta_k$, as described above. It should be appreciated that the output of the Kalman filter is the state, $x_k$, which has been defined as the user's heading as described above. Further, in some embodiments, the mobile computing device 100 may apply a different filter for determining the user's heading (e.g., the variation of the Kalman filter described above).

In block 444, the mobile computing device 100 determines the step length of the user (i.e., the length of the user's stride in the horizontal direction). For example, the mobile computing device 100 may determine the user's step length based on a user gait model 130 or any other suitable user step model. As described above, it should be appreciated that, in some embodiments, the step length may depend on the user's particular gait in which case the user may determine the step length based on a gait-specific model (e.g., a normal walking gait model or a swing walking gait model). In other embodiments, the mobile computing device 100 may utilize a generic user step model. In block 446, the mobile computing device 100 determines the location of the user based on the user's heading and the user's step length. In some embodiments, the mobile computing device 100 may determine that the user is located a distance (i.e., the step length) away from the user's previously determined location at the user's previous step in the direction of the user's heading.

In block 448, the mobile computing device 100 determines whether to refine the user's location. As discussed above, the Kalman filter may be reinitialized in response to detection of a large amount of horizontal rotation of the mobile computing device 100. In those circumstances, the Kalman filter may take a certain number of time/steps to converge and become stable again. Accordingly, the mobile computing device 100 may determine to refine (e.g., backstep) the determined location of the user a threshold number of steps following reinitialization of the Kalman filter. In block 450, the mobile computing device 100 refines the user's location. In the illustrative embodiment, the mobile computing device 100 does so by backstepping the user heading and location calculations. For example, in block 452, the mobile computing device 100 may backstep the user's location and calculate new locations. In particular, the mobile computing device 100 may recalculate the user's heading from the latest step back to the first step following reinitialization to update the user headings. Additionally, the mobile computing device 100 may recalculate the user's location with the updated user headings from the first step following reinitialization to the last step taken by the user (e.g., the threshold step). The method 400 returns to block 408 of FIG. 4 in which the mobile computing device 100 waits for detection of the next step by the user.

As described herein, the mobile computing device 100 may track the location of the user on a step-by-step basis using heading estimation, a Kalman filter, and adaptive controls for non-step motions of the user (e.g., tilt and large rotations). In response to detecting a step by the user, the user's new location is calculated based on the user's previous location, the estimated user heading, and the estimated step length of the user. Magnetic distortion and movements of the mobile computing device 100 unrelated to the stepping motion of the user (e.g., swinging, tilting, and rotations of the mobile computing device 100 relative to the user) are appropriately handled by the mobile computing device 100. Further, in certain circumstances, the mobile computing device 100 may refine the determined location of the user as described above.

EXAMPLES

Illustrative examples of the technologies disclosed herein are provided below. An embodiment of the technologies may include any one or more, and any combination of, the examples described below.

Example 1 includes a mobile computing device for determining a user's location, the mobile computing device comprising a plurality of inertial sensors to sense inertial characteristics of the mobile computing device; a walk classification module to determine, based on the sensed inertial characteristics, a walking gait of a user of the mobile computing device, wherein the walking gait is one of a first gait indicative of the user holding the mobile computing device to the user's side while walking or a second gait indicative of the user swinging the mobile computing device along the user's side while walking; a step detection module to detect that the user has taken a physical step based on the sensed inertial characteristics and the determined walking gait of the user, a heading determination module to determine a raw directional heading of the mobile computing device indicative of a direction of the physical step; a location determination module to determine an estimated location of the user based on the determined raw directional heading of the user, an estimated step length of the user, and a previous location of the user at the previous physical step.

Example 2 includes the subject matter of Example 1, and wherein to determine the walking gait of the user comprises to classify the walking gait of the user based on a decision tree and the sensed inertial characteristics; and wherein the decision tree identifies the walking gait of the user as the first gait or the second gait based on a plurality of parameters of the sensed inertial characteristics.

Example 3 includes the subject matter of any of Examples 1 and 2, and wherein the plurality of parameters includes at least one of an average interval of pendular motion of the mobile computing device, an average peak of pendular motion of the mobile computing device, or an amount of axial motion of the mobile computing device in a predefined period of time.

Example 4 includes the subject matter of any of Examples 1-3, and wherein to detect that the user has taken the physical step comprises to determine, in response to a determination that the walking gait of the user is the second walking gait indicative of the user swinging the mobile computing device along the user's side while walking, an acceleration of the mobile computing device based on the sensed inertial characteristics; apply a first low-pass filter to the acceleration of the mobile computing device to generate a first acceleration function; apply a second low-pass filter to the acceleration of the mobile computing device to generate a second acceleration function, wherein the first low-pass filter has a higher cutoff frequency than the second low-pass filter, determine a sinusoidal function based on the first acceleration function and the second acceleration function; and identify each peak of the sinusoidal function as corresponding with a different physical step.

Example 5 includes the subject matter of any of Examples 1-4, and wherein an independent variable of the sinusoidal function is indicative of an angle between the user's arm and a direction of gravity.

Example 6 includes the subject matter of any of Examples 1-5, and wherein the first acceleration function is generated according to $S_{A(k)}=\gamma_1*a_{mag(k)}+(1-\gamma_1)*a_{mag(k-1)}$, the second acceleration function is generated according to $S_{B(k)}=\gamma_2*a_{mag(k)}+(1-\gamma_2)*a_{mag(k-1)}$, and the sinusoidal function is determined according to $\cos(\theta_k)=|S_{A(k)}*S_{B(k)}|/(|S_{A(k)}|*|S_{B(k)}|)$, wherein $S_{A(k)}$ is the first acceleration function, $S_{B(k)}$ is the first acceleration function, $\gamma_1$ is a first filter parameter of the first low-pass filter, $\gamma_{21}$ is a second filter parameter of the second low-pass filter, $a_{mag(k)}$ is a magnitude of the acceleration at a step k, and $a_{mag(k-1)}$ is a magnitude of the acceleration at a previous step k−1.

Example 7 includes the subject matter of any of Examples 1-6, and wherein to determine the raw directional heading of the mobile computing device in the direction comprises to determine a velocity of the mobile computing device in the direction.

Example 8 includes the subject matter of any of Examples 1-7, and wherein to determine the velocity of the mobile computing device in the direction comprises to determine an acceleration of the mobile computing device based on the sensed inertial characteristics; convert the determined acceleration of the mobile computing device from a frame of reference of the mobile computing device to an acceleration in Earth's frame of reference; and integrate the acceleration in Earth's frame of reference to determine a velocity in Earth's frame of reference, wherein intervals of integration of the acceleration are based on a user gait model corresponding with the determined walking gait of the user.

Example 9 includes the subject matter of any of Examples 1-8, and further including a magnetic distortion detection module to determine whether to utilize magnetometric measurements to determine the raw directional heading of the user based on the sensed inertial characteristics.

Example 10 includes the subject matter of any of Examples 1-9, and wherein to determine the raw directional heading of the mobile computing device comprises to determine the raw directional heading of the mobile computing device based on data indicative of an acceleration and orientation of the mobile computing device in response to a determination not to utilize the magnetometric measurements; and wherein to determine the raw directional heading of the mobile computing device comprises to determine the raw directional heading of the mobile computing device based on data indicative of the acceleration and the orientation of the mobile computing device and a magnetic field in the vicinity of the mobile computing device in response to a determination to utilize the magnetometric measurements.

Example 11 includes the subject matter of any of Examples 1-10, and wherein to determine whether to utilize the magnetometric measurements comprises to determine an acceleration of the mobile computing device; sense a magnetic field in a vicinity of the mobile computing device; determine a dip angle between a direction of the acceleration and a direction of the magnetic field in response to a determination that a magnitude of the acceleration does not exceed an acceleration threshold and a magnitude of the magnetic field does not exceed a magnetism threshold; and compare the dip angle to an expected dip angle.

Example 12 includes the subject matter of any of Examples 1-11, and wherein to determine the walking gait of the user, detect that the user has taken the physical step, determine the raw directional heading of the mobile computing device, and determine the estimated location of the user comprises to determine a walking gait of the user, detect that the user has taken a physical step, determine a raw directional heading of the mobile computing device, and determine an estimated location of the user for each of a plurality of sequential physical steps taken by the user.

Example 13 includes the subject matter of any of Examples 1-12, and further including a Kalman filter module to apply a Kalman filter to determine a heading of the user based on the determined raw directional heading of the user and a variation of an orientation of the mobile computing device relative to a previous orientation of the mobile computing device at a previous physical step of the user; and wherein to determine the estimated location of the user comprises to determine the estimated location of the user based on the determined heading of the user.

Example 14 includes the subject matter of any of Examples 1-13, and further including a motion management module to determine whether the mobile computing device has been rotated along a horizontal plane by an amount exceeding a reference threshold; and reinitialize the Kalman filter in response to a determination that the mobile computing device has been rotated along the horizontal plane by an amount exceeding the reference threshold.

Example 15 includes the subject matter of any of Examples 1-14, and further including a motion management module to determine whether the mobile computing device has been tilted in a non-horizontal direction in response to detection that the user has taken the physical step; and ignore the detected physical step in response to a determination that the mobile computing device has been tilted in the non-horizontal direction.

Example 16 includes the subject matter of any of Examples 1-15, and wherein the location determination module is further to determine the estimated step length of the user based on a user gait model.

Example 17 includes a method for determining a user's location by a mobile computing device, the method comprising determining, by the mobile computing device and based on sensed inertial characteristics of the mobile computing device, a walking gait of a user of the mobile computing device, wherein the walking gait is one of a first gait indicative of the user holding the mobile computing device to the user's side while walking or a second gait indicative of the user swinging the mobile computing device along the user's side while walking; detecting, by the mobile computing device, that the user has taken a physical step based on the sensed inertial characteristics and the determined walking gait of the user; determining, by the mobile computing device, a raw directional heading of the mobile computing device indicative of a direction of the physical step; and determining, by the mobile computing device, an estimated location of the user based on the determined raw directional heading of the user, an estimated step length of the user, and a previous location of the user at the previous physical step.

Example 18 includes the subject matter of Example 17, and wherein determining the walking gait of the user comprises classifying the walking gait of the user based on a decision tree and the sensed inertial characteristics; and wherein the decision tree identifies the walking gait of the user as the first gait or the second gait based on a plurality of parameters of the sensed inertial characteristics.

Example 19 includes the subject matter of any of Examples 17 and 18, and wherein the plurality of parameters includes at least one of an average interval of pendular motion of the mobile computing device, an average peak of pendular motion of the mobile computing device, or an amount of axial motion of the mobile computing device in a predefined period of time.

Example 20 includes the subject matter of any of Examples 17-19, and wherein detecting that the user has taken the physical step comprises determining, in response to a determination that the walking gait of the user is the second walking gait indicative of the user swinging the mobile computing device along the user's side while walking, an acceleration of the mobile computing device based on the sensed inertial characteristics; applying a first low-pass filter to the acceleration of the mobile computing device to generate a first acceleration function; applying a second low-pass filter to the acceleration of the mobile computing device to generate a second acceleration function, wherein the first low-pass filter has a higher cutoff frequency than the second low-pass filter; determining a sinusoidal function based on the first acceleration function and the second acceleration function, and identifying each peak of the sinusoidal function as corresponding with a different physical step.

Example 21 includes the subject matter of any of Examples 17-20, and wherein an independent variable of the sinusoidal function is indicative of an angle between the user's arm and a direction of gravity.

Example 22 includes the subject matter of any of Examples 17-21, and wherein the first acceleration function is generated according to $S_{A(k)}=\gamma_1*a_{mag(k)}+(1-\gamma_1)*a_{mag(k-1)}$, the second acceleration function is generated according to $S_{B(k)}=\gamma_2*a_{mag(k)}+(1-\gamma_2)*a_{mag(k-1)}$, and the sinusoidal function is determined according to $\cos(\theta_k)=|S_{A(k)}*S_{B(k)}|/(|S_{A(k)}|*|S_{B(k)}|)$, wherein $S_{A(k)}$ is the first acceleration function, $S_{B(k)}$ is the first acceleration function, $\gamma_1$ is a first filter parameter of the first low-pass filter, $\gamma_{21}$ is a second filter parameter of the second low-pass filter, $a_{mag(k)}$ is a magnitude of the acceleration at a step k, and $a_{mag(k-1)}$ is a magnitude of the acceleration at a previous step k−1.

Example 23 includes the subject matter of any of Examples 17-22, and wherein determining the raw directional heading of the mobile computing device in the direction comprises determining a velocity of the mobile computing device in the direction.

Example 24 includes the subject matter of any of Examples 17-23, and wherein determining the velocity of the mobile computing device in the direction comprises determining an acceleration of the mobile computing device based on the sensed inertial characteristics; converting the determined acceleration of the mobile computing device from a frame of reference of the mobile computing device to an acceleration in Earth's frame of reference; and integrating the acceleration in Earth's frame of reference to determine a velocity in Earth's frame of reference, wherein intervals of integration of the acceleration are based on a user gait model corresponding with the determined walking gait of the user.

Example 25 includes the subject matter of any of Examples 17-24, and further including determining, by the mobile computing device, whether to utilize magnetometric measurements to determine the raw directional heading of the user based on the sensed inertial characteristics.

Example 26 includes the subject matter of any of Examples 17-25, and wherein determining the raw directional heading of the mobile computing device comprises determining the raw directional heading of the mobile computing device based on data indicative of an acceleration and orientation of the mobile computing device in response to determining not to utilize the magnetometric measurements; and wherein determining the raw directional heading of the mobile computing device comprises determining the raw directional heading of the mobile computing device based on data indicative of the acceleration and the orientation of the mobile computing device and a magnetic field in the vicinity of the mobile computing device in response to determining to utilize the magnetometric measurements.

Example 27 includes the subject matter of any of Examples 17-26, and wherein determining whether to utilize the magnetometric measurements comprises determining an acceleration of the mobile computing device; sensing a magnetic field in a vicinity of the mobile computing device; determining a dip angle between a direction of the acceleration and a direction of the magnetic field in response to a determination that a magnitude of the acceleration does not exceed an acceleration threshold and a magnitude of the magnetic field does not exceed a magnetism threshold; and comparing the dip angle to an expected dip angle.

Example 28 includes the subject matter of any of Examples 17-27, and wherein determining the walking gait of the user, detecting that the user has taken the physical step, determining the raw directional heading of the mobile computing device, and determining the estimated location of the user comprises determining a walking gait of the user, detecting that the user has taken a physical step, determining a raw directional heading of the mobile computing device, and determining an estimated location of the user for each of a plurality of sequential physical steps taken by the user.

Example 29 includes the subject matter of any of Examples 17-28, and further including applying, by the mobile computing device, a Kalman filter to determine a heading of the user based on the determined raw directional heading of the user and a variation of an orientation of the mobile computing device relative to a previous orientation of the mobile computing device at a previous physical step of the user; and wherein determining the estimated location of the user comprises determining the estimated location of the user based on the determined heading of the user.

Example 30 includes the subject matter of any of Examples 17-29, and further including determining, by the mobile computing device, whether the mobile computing device has been rotated along a horizontal plane by an amount exceeding a reference threshold; and reinitializing, by the mobile computing device, the Kalman filter in response to determining the mobile computing device has been rotated along the horizontal plane by an amount exceeding the reference threshold.

Example 31 includes the subject matter of any of Examples 17-30, and further including determining, by the mobile computing device, whether the mobile computing device has been tilted in a non-horizontal direction in response to detecting that the user has taken the physical step; and ignoring, by the mobile computing device, the detected physical step in response to determining the mobile computing device has been tilted in the non-horizontal direction.

Example 32 includes the subject matter of any of Examples 17-31, and further including determining, by the mobile computing device, the estimated step length of the user based on a user gait model.

Example 33 includes a computing device comprising a processor; and a memory having stored therein a plurality of instructions that when executed by the processor cause the computing device to perform the method of any of Examples 17-32.

Example 34 includes one or more machine readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a mobile computing device for determining a user's location, the mobile computing device comprising a plurality of inertial sensors to sense inertial characteristics of the mobile computing device; means for determining a walking gait of a user of the mobile computing device based on the sensed inertial characteristics, wherein the walking gait is one of a first gait indicative of the user holding the mobile computing device to the user's side while walking or a second gait indicative of the user swinging the mobile computing device along the user's side while walking; means for detecting that the user has taken a physical step based on the sensed inertial characteristics and the determined walking gait of the user; means for determining a raw directional heading of the mobile computing device indicative of a direction of the physical step; and means for determining an estimated location of the user based on the determined raw directional heading of the user, an estimated step length of the user, and a previous location of the user at the previous physical step.

Example 37 includes the subject matter of Example 36, and wherein the means for determining the walking gait of the user comprises means for classifying the walking gait of the user based on a decision tree and the sensed inertial characteristics; and wherein the decision tree identifies the walking gait of the user as the first gait or the second gait based on a plurality of parameters of the sensed inertial characteristics.

Example 38 includes the subject matter of any of Examples 36 and 37, and wherein the plurality of parameters includes at least one of an average interval of pendular motion of the mobile computing device, an average peak of pendular motion of the mobile computing device, or an amount of axial motion of the mobile computing device in a predefined period of time.

Example 39 includes the subject matter of any of Examples 36-38, and wherein the means for detecting that the user has taken the physical step comprises means for determining, in response to a determination that the walking gait of the user is the second walking gait indicative of the user swinging the mobile computing device along the user's side while walking, an acceleration of the mobile computing device based on the sensed inertial characteristics; means for applying a first low-pass filter to the acceleration of the mobile computing device to generate a first acceleration function; means for applying a second low-pass filter to the acceleration of the mobile computing device to generate a second acceleration function, wherein the first low-pass filter has a higher cutoff frequency than the second low-pass filter; means for determining a sinusoidal function based on the first acceleration function and the second acceleration function; and means for identifying each peak of the sinusoidal function as corresponding with a different physical step.

Example 40 includes the subject matter of any of Examples 36-39, and wherein an independent variable of the sinusoidal function is indicative of an angle between the user's arm and a direction of gravity.

Example 41 includes the subject matter of any of Examples 36-40, and wherein the first acceleration function is generated according to $S_{A(k)}=\gamma_1*a_{mag(k)}+(1-\gamma_1)*a_{mag(k-1)}$, the second acceleration function is generated according to $S_{B(k)}=\gamma_2*a_{mag(k)}+(1-\gamma_2)*a_{mag(k-1)}$, and the sinusoidal function is determined according to $\cos(\theta_k)=|S_{A(k)}*S_{B(k)}|/(|S_{A(k)}|*|S_{B(k)}|)$, wherein $S_{A(k)}$ is the first acceleration function. $S_{B(k)}$ is the first acceleration function, $\gamma_1$ is a first filter parameter of the first low-pass filter, $\gamma_{21}$ is a second filter parameter of the second low-pass filter, $a_{mag(k)}$ is a magnitude of the acceleration at a step k, and $a_{mag(k-1)}$ is a magnitude of the acceleration at a previous step k−1.

Example 42 includes the subject matter of any of Examples 36-41, and the means for determining the raw directional heading of the mobile computing device in the direction comprises means for determining a velocity of the mobile computing device in the direction.

Example 43 includes the subject matter of any of Examples 36-42, and wherein the means for determining the velocity of the mobile computing device in the direction comprises means for determining an acceleration of the mobile computing device based on the sensed inertial characteristics; means for converting the determined acceleration of the mobile computing device from a frame of reference of the mobile computing device to an acceleration in Earth's frame of reference; and means for integrating the acceleration in Earth's frame of reference to determine a velocity in Earth's frame of reference, wherein intervals of integration of the acceleration are based on a user gait model corresponding with the determined walking gait of the user.

Example 44 includes the subject matter of any of Examples 36-43, and further including means for determining whether to utilize magnetometric measurements to determine the raw directional heading of the user based on the sensed inertial characteristics.

Example 45 includes the subject matter of any of Examples 36-44, and wherein the means for determining the raw directional heading of the mobile computing device comprises means for determining the raw directional heading of the mobile computing device based on data indicative of an acceleration and orientation of the mobile computing device in response to a determination not to utilize the magnetometric measurements; and wherein the means for determining the raw directional heading of the mobile computing device comprises means for determining the raw directional heading of the mobile computing device based on data indicative of the acceleration and the orientation of the mobile computing device and a magnetic field in the vicinity of the mobile computing device in response to a determination to utilize the magnetometric measurements.

Example 46 includes the subject matter of any of Examples 36-45, and wherein the means for determining whether to utilize the magnetometric measurements comprises means for determining an acceleration of the mobile computing device; means for sensing a magnetic field in a vicinity of the mobile computing device; means for determining a dip angle between a direction of the acceleration and a direction of the magnetic field in response to a determination that a magnitude of the acceleration does not exceed an acceleration threshold and a magnitude of the magnetic field does not exceed a magnetism threshold; and means for comparing the dip angle to an expected dip angle.

Example 47 includes the subject matter of any of Examples 36-46, and wherein the means for determining the walking gait of the user, the means for detecting that the user has taken the physical step, the means for determining the raw directional heading of the mobile computing device, and the means for determining the estimated location of the user comprises means for determining a walking gait of the user, means for detecting that the user has taken a physical step, means for determining a raw directional heading of the mobile computing device, and means for determining an estimated location of the user for each of a plurality of sequential physical steps taken by the user.

Example 48 includes the subject matter of any of Examples 36-47, and further including means for applying a Kalman filter to determine a heading of the user based on the determined raw directional heading of the user and a variation of an orientation of the mobile computing device relative to a previous orientation of the mobile computing device at a previous physical step of the user; and wherein the means for determining the estimated location of the user comprises means for determining the estimated location of the user based on the determined heading of the user.

Example 49 includes the subject matter of any of Examples 36-48, and further including means for determining whether the mobile computing device has been rotated along a horizontal plane by an amount exceeding a reference threshold; and means for reinitializing the Kalman filter in response to a determination that the mobile computing device has been rotated along the horizontal plane by an amount exceeding the reference threshold.

Example 50 includes the subject matter of any of Examples 36-49, and further including means for determining whether the mobile computing device has been tilted in a non-horizontal direction in response to a detection that the user has taken the physical step; and means for ignoring the detected physical step in response to a determination that the mobile computing device has been tilted in the non-horizontal direction.

Example 51 includes the subject matter of any of Examples 36-50, and further including means for determining the estimated step length of the user based on a user gait model.

The invention claimed is:

1. A mobile computing device for determining a user's location, the mobile computing device comprising:

a plurality of inertial sensors to sense inertial characteristics of the mobile computing device;

a walk classification module to determine, based on the sensed inertial characteristics, a walking gait of a user of the mobile computing device, wherein the walking gait is one of a first gait indicative of the user holding the mobile computing device to the user's side while walking or a second gait indicative of the user swinging the mobile computing device along the user's side while walking;

a step detection module to detect that the user has taken a physical step based on the sensed inertial characteristics and the determined walking gait of the user;

a heading determination module to determine a raw directional heading of the mobile computing device indicative of a direction of the physical step;

a location determination module to determine an estimated location of the user based on the determined raw directional heading of the user, an estimated step length of the user, and a previous location of the user at the previous physical step.

2. The mobile computing device of claim 1, wherein to determine the walking gait of the user comprises to classify the walking gait of the user based on a decision tree and the sensed inertial characteristics; and wherein the decision tree identifies the walking gait of the user as the first gait or the second gait based on a plurality of parameters of the sensed inertial characteristics.

3. The mobile computing device of claim 1, wherein to detect that the user has taken the physical step comprises to:

determine, in response to a determination that the walking gait of the user is the second walking gait indicative of the user swinging the mobile computing device along the user's side while walking, an acceleration of the mobile computing device based on the sensed inertial characteristics;

apply a first low-pass filter to the acceleration of the mobile computing device to generate a first acceleration function;

apply a second low-pass filter to the acceleration of the mobile computing device to generate a second acceleration function, wherein the first low-pass filter has a higher cutoff frequency than the second low-pass filter;

determine a sinusoidal function based on the first acceleration function and the second acceleration function; and identify each peak of the sinusoidal function as corresponding with a different physical step.

4. The mobile computing device of claim 3, wherein an independent variable of the sinusoidal function is indicative of an angle between the user's arm and a direction of gravity.

5. The mobile computing device of claim 3, wherein the first acceleration function is generated according to $S_{A(k)}=\gamma_1*a_{mag(k)}+(1-\gamma_1)*a_{mag(k-1)}$, the second acceleration function is generated according to $S_{B(k)}=\gamma_2*a_{mag(k)}+(1-\gamma_2)*a_{mag(k-1)}$, and the sinusoidal function is determined according to $\cos(\theta_k)=|S_{A(k)}*S_{B(k)}|/(|S_{A(k)}|*|S_{B(k)}|)$, wherein:

$S_{A(k)}$ is the first acceleration function, $S_{B(k)}$ is the first acceleration function, $\gamma_1$ is a first filter parameter of the first low-pass filter, $\gamma_{21}$ is a second filter parameter of the second low-pass filter, $a_{mag(k)}$ is a magnitude of the acceleration at a step k, and $a_{mag(k-1)}$ is a magnitude of the acceleration at a previous step k−1.

6. The mobile computing device of claim 1, wherein to determine the raw directional heading of the mobile computing device in the direction comprises to determine a velocity of the mobile computing device in the direction.

7. The mobile computing device of claim 6, wherein to determine the velocity of the mobile computing device in the direction comprises to:

determine an acceleration of the mobile computing device based on the sensed inertial characteristics;

convert the determined acceleration of the mobile computing device from a frame of reference of the mobile computing device to an acceleration in Earth's frame of reference; and integrate the acceleration in Earth's frame of reference to determine a velocity in Earth's frame of reference, wherein intervals of integration of the acceleration are based on a user gait model corresponding with the determined walking gait of the user.

8. The mobile computing device of claim 1, further comprising a magnetic distortion detection module to determine whether to utilize magnetometric measurements to determine the raw directional heading of the user based on the sensed inertial characteristics.

9. The mobile computing device of claim 8, wherein to determine the raw directional heading of the mobile computing device comprises to determine the raw directional heading of the mobile computing device based on data indicative of an acceleration and orientation of the mobile computing device in response to a determination not to utilize the magnetometric measurements; and wherein to determine the raw directional heading of the mobile computing device comprises to determine the raw directional heading of the mobile computing device based on data indicative of the acceleration and the orientation of the mobile computing device and a magnetic field in the vicinity of the mobile computing device in response to a determination to utilize the magnetometric measurements.

10. The mobile computing device of claim 8, wherein to determine whether to utilize the magnetometric measurements comprises to:

determine an acceleration of the mobile computing device;

sense a magnetic field in a vicinity of the mobile computing device;

determine a dip angle between a direction of the acceleration and a direction of the magnetic field in response to a determination that a magnitude of the acceleration does not exceed an acceleration threshold and a magnitude of the magnetic field does not exceed a magnetism threshold; and compare the dip angle to an expected dip angle.

11. The mobile computing device of claim 1, wherein to determine the walking gait of the user, detect that the user has taken the physical step, determine the raw directional heading of the mobile computing device, and determine the estimated location of the user comprises to:

determine a walking gait of the user, detect that the user has taken a physical step, determine a raw directional heading of the mobile computing device, and determine an estimated location of the user for each of a plurality of sequential physical steps taken by the user.

12. The mobile computing device of claim 11, further comprising a Kalman filter module to apply a Kalman filter to determine a heading of the user based on the determined raw directional heading of the user and a variation of an orientation of the mobile computing device relative to a previous orientation of the mobile computing device at a previous physical step of the user; and wherein to determine the estimated location of the user comprises to determine the estimated location of the user based on the determined heading of the user.

13. One or more machine-readable storage media comprising a plurality of instructions stored thereon that, in response to execution by a mobile computing device, cause the mobile computing device to:

determine a walking gait of a user of the mobile computing device based on sensed inertial characteristics of the mobile computing device, wherein the walking gait is one of a first gait indicative of the user holding the mobile computing device to the user's side while walking or a second gait indicative of the user swinging the mobile computing device along the user's side while walking;

determine that the user has taken a physical step based on the sensed inertial characteristics and the determined walking gait of the user;

determine a raw directional heading of the mobile computing device indicative of a direction of the physical step; and determine an estimated location of the user based on the determined raw directional heading of the user, an estimated step length of the user, and a previous location of the user at the previous physical step.

14. The one or more machine-readable storage media of claim 13, wherein to determine the walking gait of the user comprises to classify the walking gait of the user based on a decision tree and the sensed inertial characteristics; and wherein the decision tree identifies the walking gait of the user as the first gait or the second gait based on a plurality of parameters of the sensed inertial characteristics.

15. The one or more machine-readable storage media of claim 14, wherein the plurality of parameters includes at least one of an average interval of pendular motion of the mobile computing device, an average peak of pendular motion of the mobile computing device, or an amount of axial motion of the mobile computing device in a predefined period of time.

16. The one or more machine-readable storage media of claim 13, wherein to detect that the user has taken the physical step comprises to:

determine, in response to a determination that the walking gait of the user is the second walking gait indicative of the user swinging the mobile computing device along the user's side while walking, an acceleration of the mobile computing device based on the sensed inertial characteristics;

apply a first low-pass filter to the acceleration of the mobile computing device to generate a first acceleration function;

apply a second low-pass filter to the acceleration of the mobile computing device to generate a second acceleration function, wherein the first low-pass filter has a higher cutoff frequency than the second low-pass filter;

determine a sinusoidal function based on the first acceleration function and the second acceleration function; and identify each peak of the sinusoidal function as corresponding with a different physical step.

17. The one or more machine-readable storage media of claim 16, wherein the first acceleration function is generated according to $S_{A(k)}=\gamma_1*a_{mag(k)}+(1-\gamma_1)*a_{mag(k-1)}$, the second acceleration function is generated according to $S_{B(k)}=\gamma_2*a_{mag(k)}+(1-\gamma_2)*a_{mag(k-1)}$, and the sinusoidal function is determined according to $\cos(\theta_k)=|S_{A(k)}*S_{B(k)}|/(|S_{A(k)}|*|S_{B(k)}|)$, wherein:

$S_{A(k)}$ is the first acceleration function, $S_{B(k)}$ is the first acceleration function, $\gamma_1$ is a first filter parameter of the first low-pass filter, $\gamma_{21}$ is a second filter parameter of the second low-pass filter, $a_{mag(k)}$ is a magnitude of the acceleration at a step k, and $a_{mag(k-1)}$ is a magnitude of the acceleration at a previous step k−1.

18. The one or more machine-readable storage media of claim 13, wherein to determine the raw directional heading of the mobile computing device in the direction comprises to determine a velocity of the mobile computing device in the direction.

19. The one or more machine-readable storage media of claim 18, wherein to determine the velocity of the mobile computing device in the direction comprises to:

determine an acceleration of the mobile computing device based on the sensed inertial characteristics;

convert the determined acceleration of the mobile computing device from a frame of reference of the mobile computing device to an acceleration in Earth's frame of reference; and integrate the acceleration in Earth's frame of reference to determine a velocity in Earth's frame of reference, wherein intervals of integration of the acceleration are based on a user gait model corresponding with the determined walking gait of the user.

20. The one or more machine-readable storage media of claim 13, wherein to determine the walking gait of the user, detect that the user has taken the physical step, determine the raw directional heading of the mobile computing device, and determine the estimated location of the user comprises to:

determine a walking gait of the user, detect that the user has taken a physical step, determine a raw directional heading of the mobile computing device, and determine an estimated location of the user for each of a plurality of sequential physical steps taken by the user.

21. A method for determining a user's location by a mobile computing device, the method comprising:

determining, by the mobile computing device and based on sensed inertial characteristics of the mobile computing device, a walking gait of a user of the mobile computing device, wherein the walking gait is one of a first gait indicative of the user holding the mobile computing device to the user's side while walking or a second gait indicative of the user swinging the mobile computing device along the user's side while walking;

detecting, by the mobile computing device, that the user has taken a physical step based on the sensed inertial characteristics and the determined walking gait of the user;

determining, by the mobile computing device, a raw directional heading of the mobile computing device indicative of a direction of the physical step; and determining, by the mobile computing device, an estimated location of the user based on the determined raw directional heading of the user, an estimated step length of the user, and a previous location of the user at the previous physical step.

22. The method of claim 21, further comprising determining, by the mobile computing device, whether to utilize magnetometric measurements to determine the raw directional heading of the user based on the sensed inertial characteristics.

23. The method of claim 22, wherein determining the raw directional heading of the mobile computing device comprises determining the raw directional heading of the mobile computing device based on data indicative of an acceleration and orientation of the mobile computing device in response to determining not to utilize the magnetometric measurements; and wherein determining the raw directional heading of the mobile computing device comprises determining the raw directional heading of the mobile computing device based on data indicative of the acceleration and the orientation of the mobile computing device and a magnetic field in the vicinity of the mobile computing device in response to determining to utilize the magnetometric measurements.

24. The method of claim 23, wherein determining whether to utilize the magnetometric measurements comprises:

determining an acceleration of the mobile computing device;

sensing a magnetic field in a vicinity of the mobile computing device;

determining a dip angle between a direction of the acceleration and a direction of the magnetic field in response to a determination that a magnitude of the acceleration does not exceed an acceleration threshold and a magnitude of the magnetic field does not exceed a magnetism threshold; and comparing the dip angle to an expected dip angle.

25. The method of claim 21, wherein determining the walking gait of the user, detecting that the user has taken the physical step, determining the raw directional heading of the mobile computing device, and determining the estimated location of the user comprises:

determining a walking gait of the user, detecting that the user has taken a physical step, determining a raw directional heading of the mobile computing device, and determining an estimated location of the user for each of a plurality of sequential physical steps taken by the user.

* * * * *